United States Patent
Cho et al.

(10) Patent No.: US 12,475,954 B2
(45) Date of Patent: Nov. 18, 2025

(54) MEMORY DEVICE INCLUDING PAGE BUFFER CIRCUIT AND SSD INCLUDING THE MEMORY DEVICE, AND METHOD OF USING THE SAME

(71) Applicant: Samsung Electronics Co., Ltd., Suwon-si (KR)

(72) Inventors: Yongsung Cho, Suwon-si (KR); Daeseok Byeon, Suwon-si (KR); Minjeong Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 106 days.

(21) Appl. No.: 18/223,278

(22) Filed: Jul. 18, 2023

(65) Prior Publication Data

US 2024/0153565 A1    May 9, 2024

(30) Foreign Application Priority Data

Nov. 7, 2022  (KR) .................. 10-2022-0147395

(51) Int. Cl.
*G11C 7/00*       (2006.01)
*G11C 16/04*      (2006.01)
*G11C 16/24*      (2006.01)
*G11C 16/26*      (2006.01)

(52) U.S. Cl.
CPC .......... *G11C 16/24* (2013.01); *G11C 16/0483* (2013.01); *G11C 16/26* (2013.01)

(58) Field of Classification Search
CPC ....... G11C 7/1051; G11C 7/1078; G11C 7/22; G11C 7/106; G11C 7/1057
USPC ................................................... 365/189.05
See application file for complete search history.

(56) References Cited

U.S. PATENT DOCUMENTS

| | | | |
|---|---|---|---|
| 7,679,966 B2 | 3/2010 | Kang et al. | |
| 9,129,696 B2 | 9/2015 | Joo et al. | |
| 9,142,296 B2 | 9/2015 | Kim et al. | |
| 10,290,343 B2 | 5/2019 | Kim et al. | |
| 10,720,207 B2 * | 7/2020 | Cho | G11C 16/0483 |
| 10,720,220 B2 | 7/2020 | Kamata et al. | |
| 10,726,929 B1 | 7/2020 | Yang | |
| 10,867,664 B1 | 12/2020 | She et al. | |
| 2005/0078524 A1 | 4/2005 | Hosono | |

(Continued)

OTHER PUBLICATIONS

Extended European Search Report dated Mar. 5, 2024 for corresponding EP Patent Application No. 23208220.6.

*Primary Examiner* — Son T Dinh
(74) *Attorney, Agent, or Firm* — Muir Patent Law, PLLC

(57) ABSTRACT

A memory device includes a memory cell array, and a plurality of page buffer units, the page buffer units each including a sensing node, a data transfer node, a first transistor precharging the data transfer node, a second transistor connecting the sensing node to the data transfer node, a sensing latch connected to the data transfer node, a third transistor changing a data value of the sensing latch, and a fourth transistor connecting the third transistor to the data transfer node, wherein, during a sensing operation, in a first time period, the sensing node is precharged based on a first path through the first transistor, the data transfer node, and the fourth transistor, and in a second time period, a voltage of the sensing node is set to a threshold voltage according to a second path through the fourth transistor, the data transfer node, and the third transistor.

20 Claims, 16 Drawing Sheets

(56) References Cited

U.S. PATENT DOCUMENTS

| | | |
|---|---|---|
| 2013/0083607 A1 | 4/2013 | Joo et al. |
| 2015/0262690 A1 | 9/2015 | Maeda |
| 2019/0385674 A1 | 12/2019 | Cho et al. |

* cited by examiner

MEMORY DEVICE INCLUDING PAGE BUFFER CIRCUIT AND SSD INCLUDING THE MEMORY DEVICE, AND METHOD OF USING THE SAME

CROSS-REFERENCE TO RELATED APPLICATION

This application is based on and claims priority under 35 U.S.C. § 119 to Korean Patent Application No. 10-2022-0147395, filed on Nov. 7, 2022 in the Korean Intellectual Property Office, the disclosure of which is incorporated by reference herein in its entirety.

BACKGROUND

The disclosed embodiments relate to a memory device, and more particularly, to a page buffer circuit and a memory device including the page buffer circuit.

Recently, in accordance with multi-functionality, large capacity and high integration of memory devices are used. Memory devices include page buffer circuits for storing data in memory cells or outputting data from the memory cells. As an example, page buffer circuits may include a plurality of page buffers arranged respectively corresponding to a plurality of bit lines, and each page buffer may include semiconductor elements such as transistors.

As the number of units of memory cells increases, channel resistance may increase and cell current may decrease, and due to process variation, characteristics between the plurality of page buffers may be different.

SUMMARY

Aspects of the inventive concept provide a memory device including a page buffer circuit performing a sensing operation by calibrating a process variation.

According to an aspect of the inventive concept, a memory device includes a memory cell array including a plurality of memory cells, and a page buffer circuit including a plurality of page buffer units respectively connected to the memory cell array via a plurality of bit lines, the page buffer units each including a sensing node, a data transfer node, a first transistor configured to precharge the data transfer node, a second transistor connecting the sensing node to the data transfer node, a sensing latch storing data sensed by the memory cell array and connected to the data transfer node, a third transistor configured to change a data value of the sensing latch according to a level of the sensing node, and a fourth transistor connecting the third transistor to the data transfer node. A method of memory access in the memory device includes, during a sensing operation, in a first time period, precharging the sensing node based on a first path through the first transistor, the data transfer node, and the fourth transistor, and in a second time period, setting a voltage of the sensing node to a threshold voltage according to a second path through the fourth transistor, the data transfer node, and the third transistor.

According to another aspect of the inventive concept, a memory device includes a memory cell array including a plurality of memory cells, and a page buffer circuit including a plurality of page buffer units respectively connected to the memory cell array via a plurality of bit lines, the plurality of page buffer units each including a sensing node connected to the bit line, a sensing latch storing data of the memory cell, a first transistor configured to change data of the sensing latch according to a voltage level of the sensing node, and a boost node configured to boost the sensing node. A method in the memory device includes, for each of the page buffer units, during sensing operation, precharging the sensing node in a first time period, setting a voltage level of the sensing node to a threshold voltage of the first transistor in a second time period, boosting up the sensing node by increasing a voltage applied to the boost node by a first voltage level in a third time period, developing the sensing node based on the voltage level of the boosted up sensing node in a fourth time period, boosting down the sensing node by reducing the voltage applied to the boost node by a second voltage level in a fifth time period, and changing a data value of the sensing latch based on the voltage level of the boosted down sensing node in a sixth time period.

According to another aspect of the inventive concept, a solid state drive (SSD) including a memory cell array, a memory device including a page buffer circuit, and a memory controller configured to control the memory device, wherein the page buffer circuit includes a sensing node connected to a bit line, a sensing latch storing data of a memory cell, a first transistor configured to change data of the sensing latch according to a voltage level of the sensing node, and a boost node for boosting the sensing node. A method for the SSD includes during a sensing operation, precharging the sensing node, setting the voltage level of the sensing node to the threshold voltage of the first transistor, and changing a data value of the sensing latch based on a set voltage level of the sensing node.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

Hereinafter, various embodiments of the inventive concept are described in conjunction with the accompanying drawings.

Figure 1:
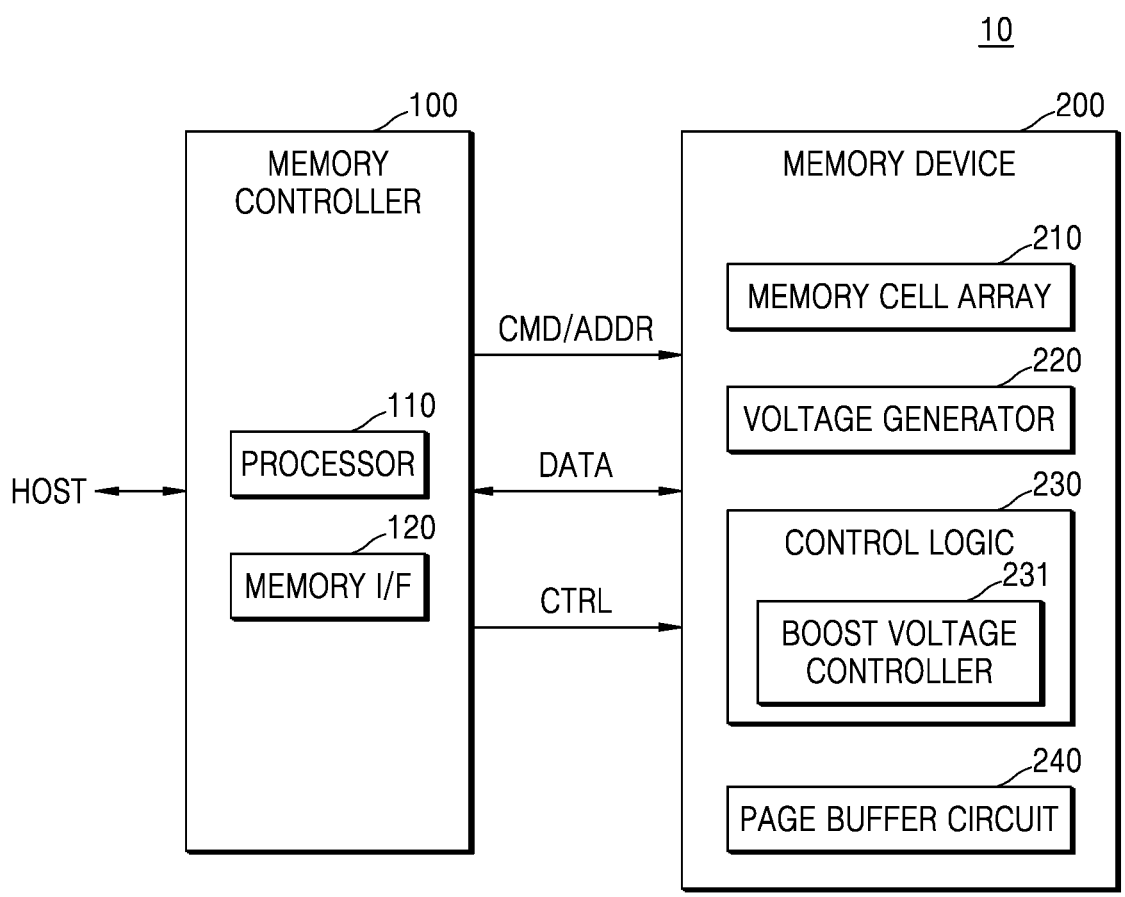
FIG. 1 is a block diagram of a memory system according to an embodiment.

FIG. 1 is a block diagram of a memory system 10 according to an example embodiment.

Referring to FIG. 1, the memory system 10 may include a memory controller 100 and a memory device 200, the memory device 200 may include a memory cell array 210, a voltage generator 220, and a control logic 230, and the control logic 230 may include a boost voltage controller 231. In the example of FIG. 1, the boost voltage controller 231 is illustrated as being arranged in the control logic 230, but the boost voltage controller 231 according to the present embodiment may be implemented as a discrete component outside the control logic 230.

For example, the memory system 10 may communicate with a host via various interfaces, and as an example, the memory system 10 may communicate with the host via various interfaces, such as a universal serial bus (USB) interface, a multi-media card (MMC) interface, an embedded MMC (eMMC) interface, a peripheral component interconnect (PCI) interface, a PCI-express (PCI-E) interface, an advanced technology attachment (ATA) interface, a serial-ATA interface, a parallel-ATA interface, a small computer system interface (SCSI), an enhanced small disk interface (ESDI), an integrated drive electronics (IDE) interface, Firewire, a universal flash storage (UFS) interface, and a non-volatile memory (NVM) express (NVMe) interface.

According to an embodiment, the memory device 200 may include a non-volatile memory device. In some embodiments, the memory system 10 may be implemented as being embedded in an electronic device or as a removable memory, and the memory system 10 may be implemented in various forms of, for example, an embedded universal flash storage (UFS) memory device, an eMMC, a solid state drive (SSD), a UFS memory card, a compact flash (CF) card, a secured digital (SD) card, a micro-SD card, a mini-SD card, an extreme digital (xD) card, or a memory stick. In addition, the memory system 10 may also be referred to as a storage device for storing data in a non-volatile manner.

The memory controller 100 may control the memory device 200 to read data stored in the memory device 200 or to write data to the memory device 200 in response to a write/read request from a host HOST. For example, the memory controller 100 may include a processor 110 and a memory interface (I/F) 120, and the processor 110 may control the whole operation of the memory controller 100, and in addition, may control the memory operation of the memory device 200. The memory controller 100 may control memory access (e.g., write, read and erase) operations of the memory device 200 by providing an address ADDR, a command CMD, and a control signal CTRL to the memory device 200 via the memory OF 120. In addition, data DATA to be stored in the memory device 200 and data DATA to be read from the memory device 200 may be transceived between the memory controller 100 and the memory device 200.

The memory cell array 210 may include a plurality of memory cells, and the plurality of memory cells may respectively include, for example, flash memory cells. Hereinafter, embodiments of the inventive concept are described in detail for the case, as an example, in which the plurality of memory cells respectively include NAND flash memory cells. However, the inventive concept is not limited thereto. In some embodiments, the plurality of memory cells may respectively include resistive memory cells, such as resistive read-only memory (RAM) (RRAM), phase-change RAM (PRAM), and magneto-resistive RAM (MRAM).

In an embodiment, the memory cell array 210 may include a three-dimensional (3D) memory cell array, the 3D memory cell array may include a plurality of cell strings, and each cell string may include the memory cells respectively connected to the word lines vertically stacked on a substrate. However, the embodiment is not limited thereto, and in some embodiments, the memory cell array 210 may include a two-dimensional (2D) memory cell array, and the 2D memory cell array may include the plurality of cell strings arranged in row and column directions.

The voltage generator 220 may generate various voltages used by the memory device 200. For example, various voltages applied to a page buffer circuit 240, or various voltages applied to word lines or bit lines connected to the memory cell array 210 may be generated. In addition, the voltage generator 220 may variously control levels of the voltage based on the control of the control logic 230.

The control logic 230 may control a whole operation of the memory device 200, and as an example, based on the command CMD, the address ADDR, and the control signal CTRL, which are received from the memory controller 100, the control logic 230 may output various internal control signals for programming data in the memory cell array 210 or reading data from the memory cell array 210. In addition, the control logic 230 may also output a voltage control signal (not illustrated) for controlling levels of various voltages, which are output by the voltage generator 220 in relation to the program operation, the read operation, a verification operation, and the erase operation.

The page buffer circuit 240 may include a plurality of page buffers PB arranged to correspond to a plurality of bit lines. As an example, each page buffer PB may include a sensing node, and be connected to memory cells via a corresponding bit line. The page buffer PB may, during a sensing operation for data stored in a corresponding memory cell, determine a logical state (or whether the memory cell is an on-cell or an off-cell), by monitoring the sensing node. As a sensing transistor is turned on or turned off according to a voltage of the sensing node, data of the memory cell may be stored in a sensing latch.

Each of the plurality of page buffers PB may include a sensing transistor, and a deviation between threshold voltages of the sensing transistors due to various variables may occur. Accordingly, when sensing nodes of the plurality of page buffers PB are precharged with the same voltage, the accuracy of sensing data may be decreased due to threshold voltage deviations of sensing transistors.

According to an embodiment, the page buffer circuit 240 may improve the accuracy of sensing data by calibrating threshold voltage deviations of sensing transistors and precharging the sensing nodes. The page buffer circuit 240 may perform a sensing operation of calibrating the threshold voltage deviations of the sensing transistors, by precharging the sensing node after setting the voltage of the sensing node at the threshold voltage of the sensing transistor.

The page buffer circuit 240 may determine on-cells and off-cells by monitoring the voltage level of the sensing node, which is reduced by the cell current during the sensing operation. A period, in which the voltage level of the sensing node is decreased by the cell current, may be referred to as a development period. When the voltage level of the sensing node decreases relatively less, the memory cell may be determined as an off-cell, and when the voltage level of the sensing node decreases relatively more, the memory cell may be determined as an on-cell. As the number of units of memory cells increases, the channel resistance may increase, and thus, the cell current may decrease. Accordingly, a bit line precharge voltage may be increased to increase the cell current. However, under the sensing operation condition, the lower limit of the voltage level of the sensing node may be greater than the bit line precharge voltage level. Accordingly, there may be a limit in increasing the bit line precharge voltage to increase the cell current.

According to an embodiment, the page buffer circuit 240 may ensure a margin for increasing the bit line precharge voltage, by boosting the sensing node based on a voltage applied to a boost node.

After the development period, when the voltage level of the sensing node is greater than a sensing trip level, the memory cell may be determined as an off-cell, and when the voltage level of the sensing node is less than the sensing trip level, the memory cell may be determined as an on-cell. The determination of an on-cell and an off-cell may be difficult due to the high voltage of the sensing node, that is caused by a boost-up of the sensing node.

The page buffer circuit 240 according to an embodiment may, by boosting down the sensing node after the development period, secure a margin for increasing the bit line precharge voltage and simultaneously determine an on-cell and an off-cell.

Figure 2:
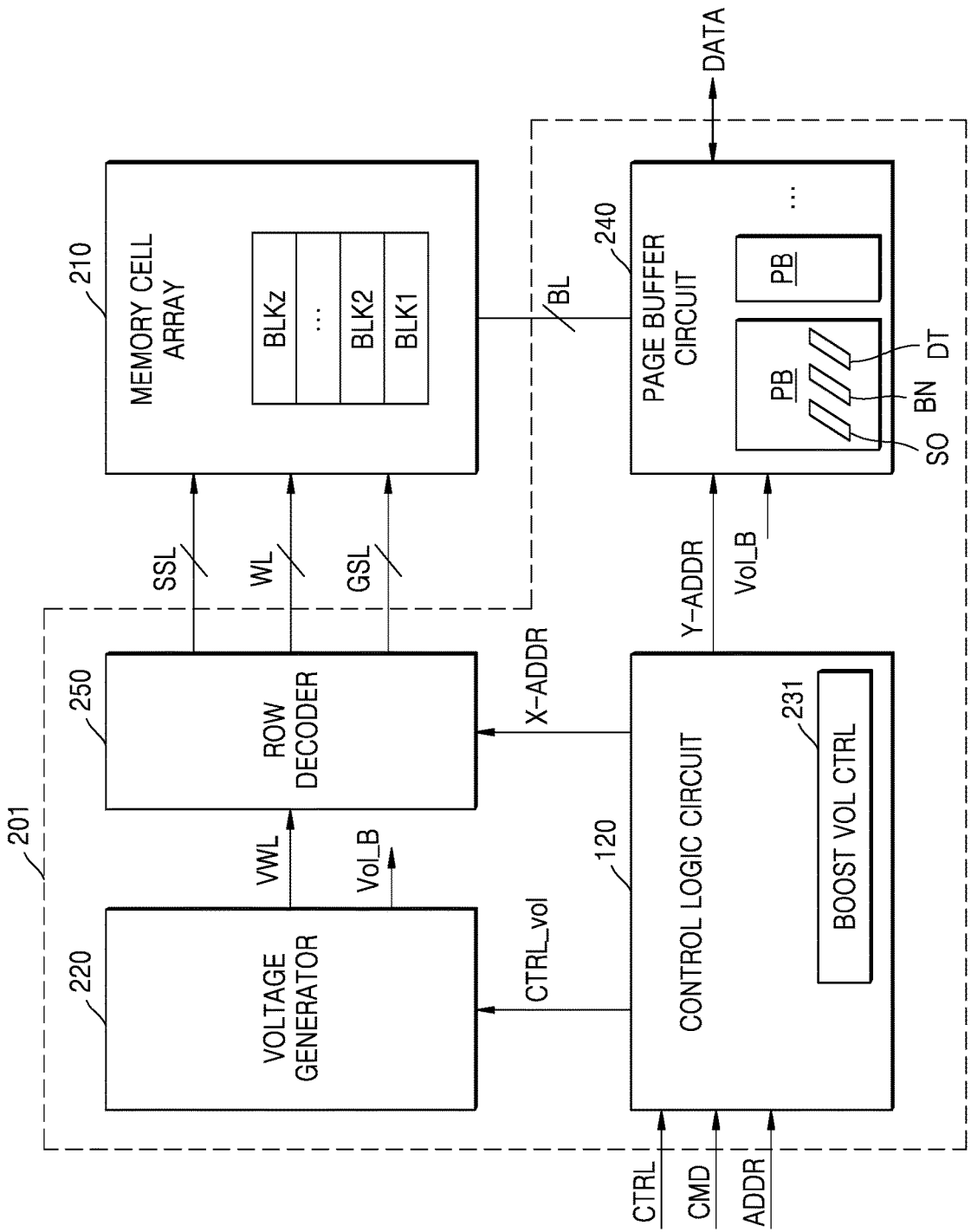
FIG. 2 is a block diagram of an example implementation of a memory device in FIG. 1.

FIG. 2 is a block diagram of an example implementation of the memory device 200 in FIG. 1.

Referring to FIG. 2, the memory device 200 may include the memory cell array 210 and a peripheral circuit 201, and the peripheral circuit 201 may include the voltage generator 220, the control logic 230, the page buffer circuit 240, and a row decoder 250. Although not illustrated in FIG. 2, the peripheral circuit 201 may further include various other components related to memory operations, such as column logic, a pre-decoder, a temperature sensor, a command decoder, an address decoder, an input/output interface, etc.

The memory cell array 210 may be connected to the page buffer circuit 240 via bit lines BLs, and may be connected to the row decoder 250 via word lines WLs, string selection lines SSLs, and ground selection lines GSLs. The memory cell array 210 may include a plurality of memory cells, and the plurality of memory cells may respectively include, for example, flash memory cells. Hereinafter, embodiments of the inventive concept are described in detail for the case, as an example, in which the plurality of memory cells respectively include NAND flash memory cells. However, the inventive concept is not limited thereto. In some embodiments, the plurality of memory cells may include resistive memory cells, such as RRAM, PRAM, ferroelectric RAM (FRAM), and magnetic RAM (MRAM).

In an embodiment, the memory cell array 210 may include a three-dimensional (3D) memory cell array, the 3D memory cell array may include a plurality of cell strings, and each cell string may include the memory cells respectively connected to the word lines vertically stacked on a substrate.

The control logic 230 may, based on the command CMD, the address ADDR, and the control signal CTRL, write or program data in the memory cell array 210, verify programmed data, read data from the memory cell array 210, or output voltage control signals for erasing data stored in the memory cell array 210, such as a voltage control signal CTRL_vol, a row address X-ADDR, and a column address Y-ADDR. In this manner, the control logic 230 may control all of various operations in the memory device 200.

The voltage generator 220 may generate various kinds of voltages for performing program, read, and erase operations on the memory cell array 210 based on the voltage control signal CTRL_vol. The voltage generator 220 may generate a word line voltage VWL, for example, a program voltage, a read voltage, a pass voltage, an erase verify voltage, or a program verify voltage. In addition, the voltage generator 220 may further generate a string selection line voltage and a ground selection line voltage based on the voltage control signal CTRL_vol. In addition, the voltage generator 220 may generate one or more voltages for driving or controlling the page buffer circuit 240, and according to embodiments, the voltage generator 220 may output a level of a voltage (for example, a boost voltage Vol_B) applied to each of the page buffers PB of the page buffer circuit 240, based on the control of the boost voltage controller 231.

The row decoder 250 may, in response to the row address X-ADDR, perform a selection operation on the plurality of word lines WL and a selection operation on a plurality of string selection lines SSL. In addition, the page buffer circuit 240 may select at least one bit line BL among the bit lines BL in response to the column address Y-ADDR. Each of the page buffers PB of the page buffer circuit 240 may operate as a write driver or a sense amplifier according to an operation mode.

The page buffer circuit 240 may include a plurality of page buffers PB arranged to correspond to a plurality of bit lines BL. Each of the page buffers PB may be connected to a corresponding bit line BL among the plurality of bit lines BL. The page buffer circuit 240 may temporarily store data read from the memory cell array 210, or may temporarily store data to be recorded in the memory cell array 210. For example, each of the page buffers PB may include one or more latches. Each of the latches may temporarily store data.

According to an embodiment, each page buffer PB may include a sensing node SO, a boost node BN, and a data transfer node DT. The page buffer PB may set the sensing node SO at a threshold voltage of the sensing transistor by connecting the sensing node SO to the data transfer node DT by using a plurality of transistors.

Figure 3:
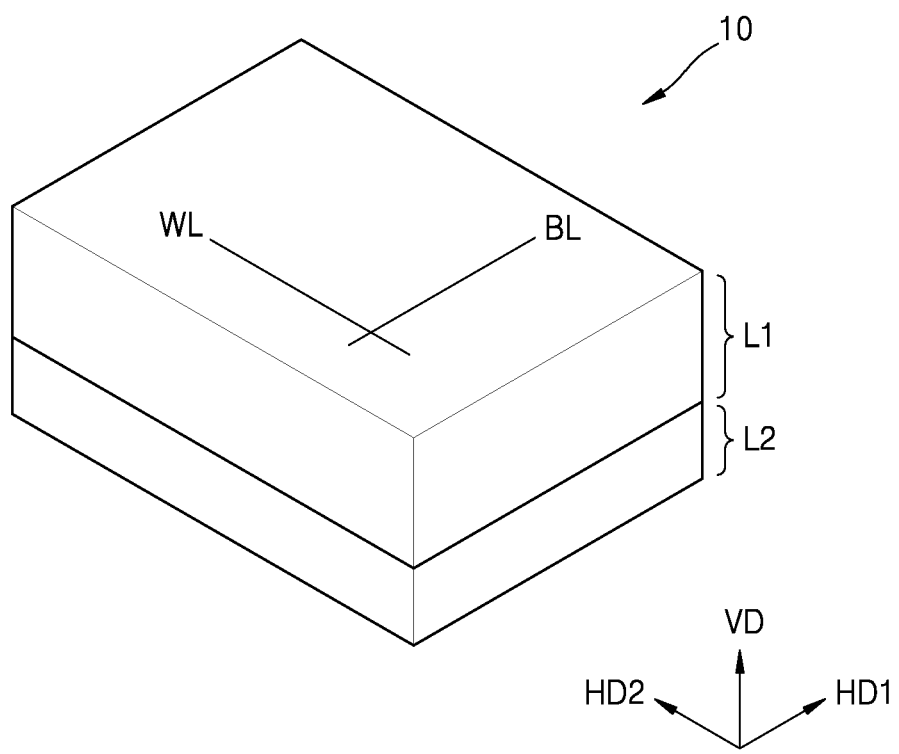
FIG. 3 is a schematic diagram of a structure of the memory device of FIG. 1, according to an embodiment.
Figure 4:
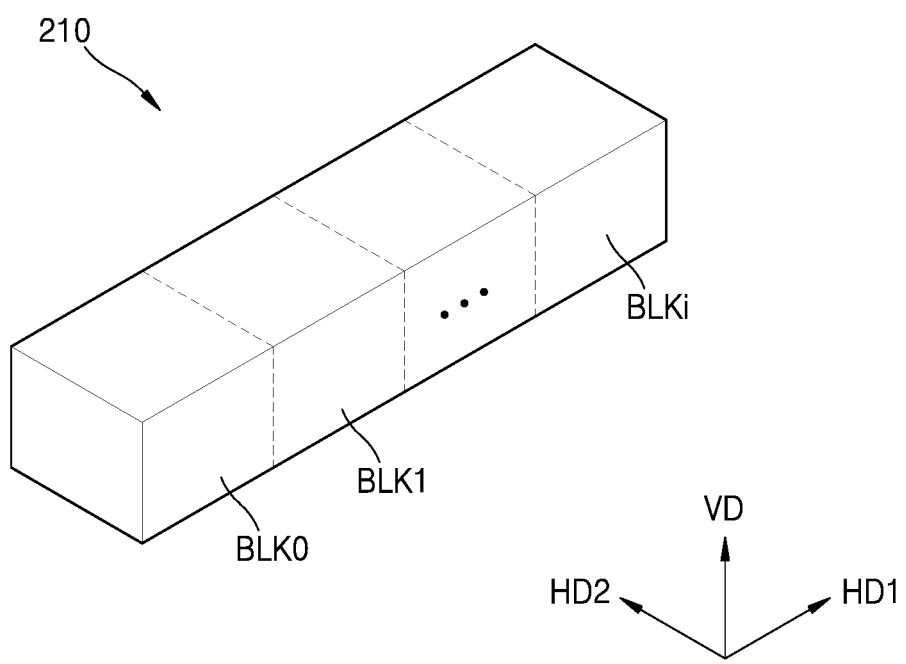
FIG. 4 is an example diagram of a memory cell array in FIG. 1.
Figure 5:
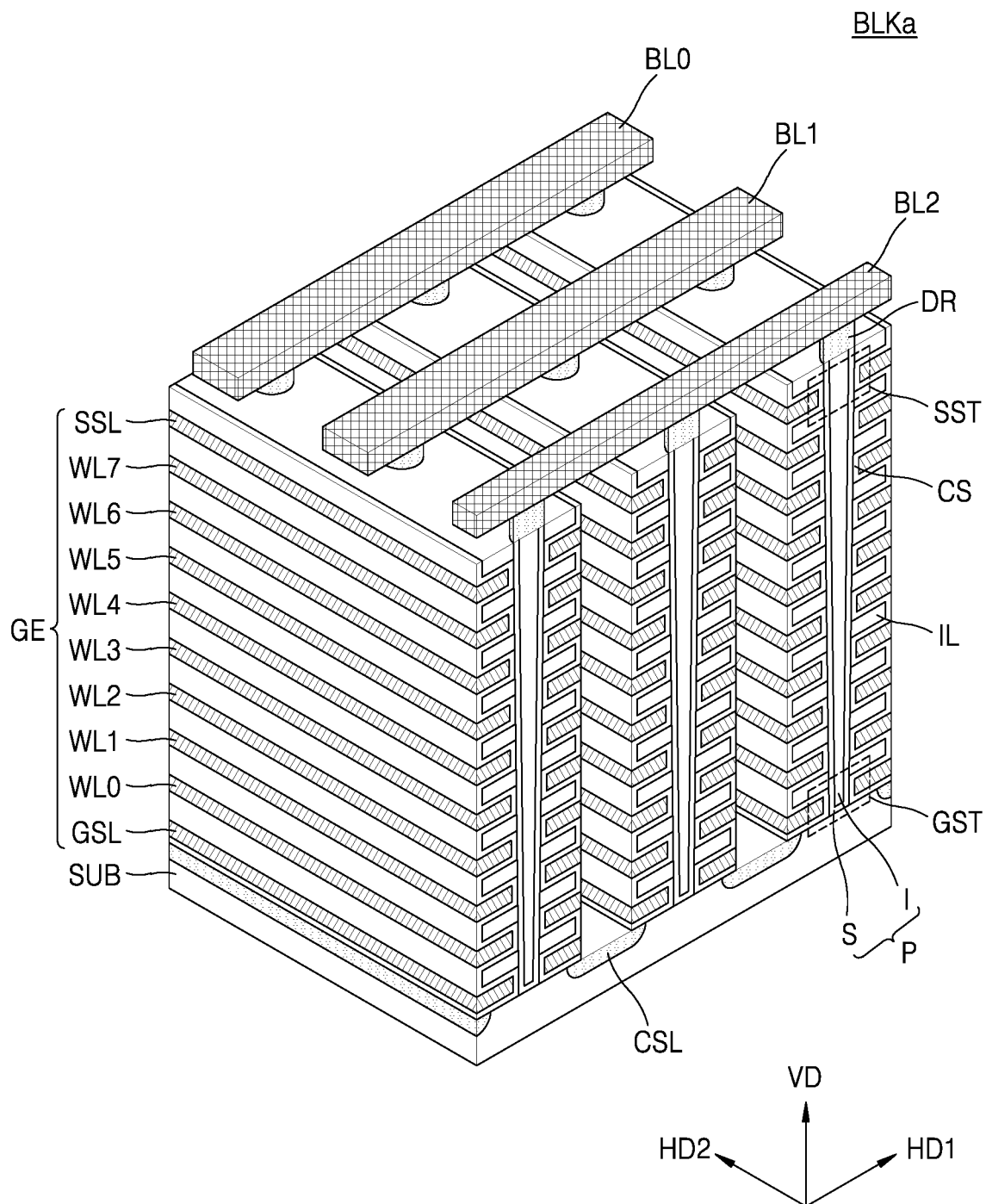
FIG. 5 is a perspective view of an example of a structure of a memory block in FIG. 4.

FIG. 3 is a schematic diagram of a structure of the memory device 200 in FIG. 1, FIG. 4 is an example diagram of the memory cell array 210 in FIG. 1, and FIG. 5 is a perspective diagram of a structure of an example of a memory block in FIG. 4. In FIG. 3, a cell over peripheral (COP) structure is illustrated as an implementation example of the memory device 200, but embodiments of the inventive concept are not limited thereto, and the memory device 200 may also be implemented by using various structures.

Referring to FIG. 3, the memory device 200 may include a first semiconductor layer L1 and a second semiconductor layer L2, and the first semiconductor layer L1 may be stacked in a vertical direction VD with respect to the second semiconductor layer L2. The second semiconductor layer L2 may be arranged under the first semiconductor layer L1 in the vertical direction VD, and accordingly, the second semiconductor layer L2 may be arranged close to a substrate.

In an embodiment, the memory cell array 210 in FIG. 1 may be formed on the first semiconductor layer L1, and the peripheral circuit 201 in FIG. 1 may be formed on the second semiconductor layer L2. Accordingly, the memory device 200 may have a structure, in which the memory cell array 210 is arranged on the peripheral circuit 201, that is, a COP structure. The COP structure may effectively reduce an area thereof in a horizontal direction, and improve a degree of integration of the memory device 200.

In an embodiment, the second semiconductor layer L2 may include a substrate, and by forming transistors and metal patterns for wiring transistors on a substrate, the peripheral circuit 201 may be formed on the second semiconductor layer L2. After the peripheral circuit 201 is formed on the second semiconductor layer L2, the first semiconductor layer L1 including the memory cell array 210 may be formed, and the metal patterns for connecting the word lines WL and the bit lines BL of the memory cell array 210 to the peripheral circuit 201 formed on the second semiconductor layer L2 may be formed. For example, the bit lines BL may extend in a first horizontal direction HD1, and the word lines WL may extend in a second horizontal direction HD2.

On the other hand, referring to FIG. 4, the memory cell array 210 may include first through $i^{th}$ memory blocks BLK0 through BLKi, wherein i is a positive integer. Each of the first through $i^{th}$ memory blocks BLK0 through BLKi may have a three-dimensional structure (or a vertical structure). Each of the first through $i^{th}$ memory blocks BLK0 through BLKi may include a plurality of NAND strings extending in the vertical direction VD. In this case, the plurality of NAND strings may be provided apart from each other by a certain distance in the first and second horizontal directions HD1 and HD2. The first through $i^{th}$ memory blocks BLK0 through BLKi may be selected by the row decoder (250 in FIG. 1). For example, the row decoder 250 may select a memory block corresponding to a block address among the first through $i^{th}$ memory blocks BLK0 through BLKi.

On the other hand, referring to FIG. 5, a memory block BLKa may be formed in a vertical direction with respect to a substrate SUB. The substrate SUB may be of a first conductivity type (for example, a p-type), and a common source line CSL, which extends in the second horizontal direction HD2 on the substrate SUB and is doped with a second conductivity type (for example, an n-type), may be provided. On a region between each two adjacent common source lines CSL on the substrate SUB, a plurality of insulating layers IL, which extend in the second horizontal direction HD2, may be sequentially provided in the vertical direction VD, and the plurality of insulating layers IL may be apart from each other by a certain distance in the vertical direction VD. For example, the plurality of insulating layers IL may include an insulating material, such as silicon oxide.

On a region between each two adjacent common source lines CSL on the substrate SUB, a plurality of pillars P, which are sequentially arranged in the first horizontal direction HD1 and respectively penetrate the plurality of insulating layers IL in the vertical direction VD, may be provided. For example, the plurality of pillars P may penetrate the plurality of insulating layers IL and contact the substrate SUB. A surface layer S of each pillar P may include or be formed of a silicon material of the first type, and may function as a channel region. On the other hand, an inner layer I of each pillar P may include an insulating material, such as silicon oxide or an air gap.

On the region between each two adjacent common source lines CSL, a charge storage layer CS may be provided along exposed surfaces of the insulating layers IL, the pillars P, and the substrate SUB. The charge storage layer CS may include a gate insulating layer (also referred to as a tunneling insulating layer), a charge trap layer, and a blocking insulating layer. For example, the charge storage layer CS may have an oxide-nitride-oxide (ONO) structure. In addition, on the region between each two adjacent common source lines CSL, gate electrodes GE, such as the selection lines (for example, GSL and SSL) and first through 8th word lines WL0 through WL7, may be provided on an exposed surface of the charge storage layer CS.

Drains or drain contacts DR may be respectively provided on the plurality of pillars P. For example, the drains or drain contacts DR may include a silicon material doped with impurities of the second conductivity type. On the drain contacts DR, first through third bit lines BL1 through BL3 extending in the first horizontal direction HD1 and apart from each other by a certain distance in the second horizontal direction HD2 may be provided.

Figure 6:
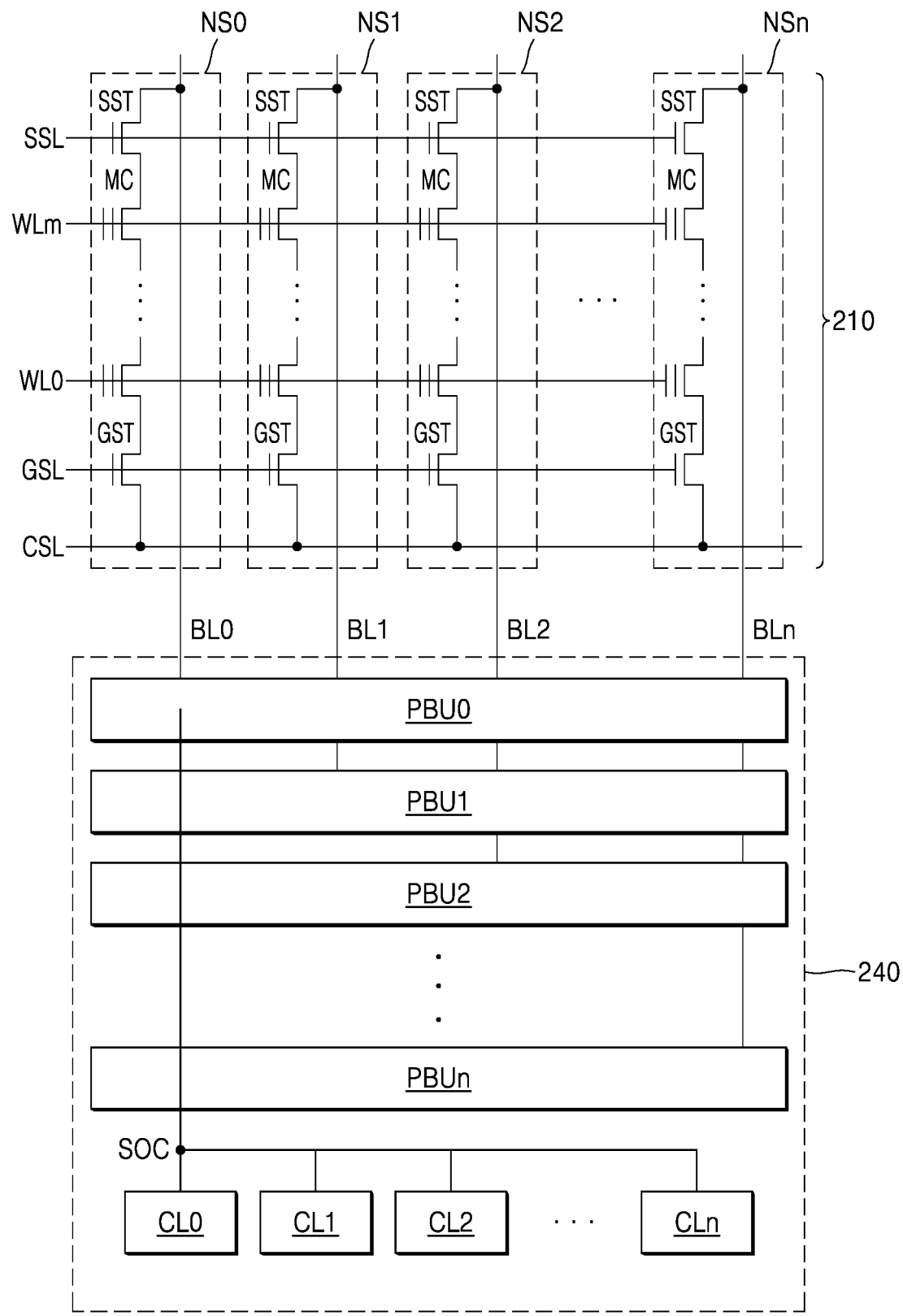
FIG. 6 is a schematic diagram of a connection of a memory cell array to a page buffer circuit, according to an embodiment.

FIG. 6 is a schematic diagram of a connection of the memory cell array 210 to the page buffer circuit 240, according to an embodiment.

Referring to FIG. 6, the memory cell array 210 may include first through (n+1)th NAND strings NS0 through NSn, each of the first through $(n+1)^{th}$ NAND strings NS0 through NSn may include a ground selection transistor GST connected to the ground selection line GSL, a plurality of memory cells MC respectively connected to first through $(m+1)^{th}$ word lines WL0 through WLm, and a string selection transistor SST connected to the string selection line SSL, and the ground selection transistor GST, the plurality of memory cells MC, and the string selection transistor SST may be connected to each other in series. In this case, m may be a positive integer.

The page buffer circuit 240 may include first through $(n+1)^{th}$ page buffer units PBU0 through PBUn. The first page buffer unit PBU0 may be connected to a first NAND string NS0 via a first bit line BL0, and the $(n+1)^{th}$ page buffer unit PBUn may be connected to an $(n+1)^{th}$ NAND string NSn via an $(n+1)^{th}$ bit line BLn. In this case, n may be a positive integer. For example, n may be 7, and the page buffer circuit 240 may have a structure in which the page buffer units of eight stages (or, the first through $(n+1)^{th}$ page buffer units PBU0 through PBUn) are arranged in a line. For example, the first through $(n+1)^{th}$ page buffer units PBU0 through PBUn may be arranged in a line in an extension direction of the first through $(n+1)^{th}$ bit lines BL0 through BLn.

The page buffer circuit 240 may further include first through $(n+1)^{th}$ cache latches CL0 through CLn respectively corresponding to the first through $(n+1)^{th}$ page buffer units PBU0 through PBUn. For example, n may be 7, and the page buffer circuit 240 may have a structure in which the cache latches of eight stages (or the first through $(n+1)^{th}$ cache latches CL0 through CLn) are arranged in a line. In FIG. 6, for convenience of illustration, it is shown that the first through $(n+1)^{th}$ cache latches CL0 through CLn are arranged in a line perpendicular to an extension direction of the first through $(n+1)^{th}$ bit lines BL0 through BLn but the embodiments are not limited thereto. For example, the first through $(n+1)^{th}$ cache latches CL0 through CLn may be arranged in an extension direction of the first through $(n+1)^{th}$ bit lines BL0 through BLn. One page buffer unit among the first through $(n+1)^{th}$ page buffer units PBU0 through PBUn and a cache latch corresponding thereto may correspond to the page buffer PB in FIG. 2.

The sensing nodes of each of the first through $(n+1)^{th}$ page buffer units PBU0 through PBUn may be commonly connected to a combined sensing node SOC. In addition, the first through $(n+1)^{th}$ cache latches CL0 through CLn may be commonly connected to a combined sensing node SOC. Accordingly, the first through $(n+1)^{th}$ page buffer units PBU0 through PBUn may be respectively connected to the first through $(n+1)^{th}$ cache latches CL0 through CLn via the combined sensing node SOC.

Figure 7:
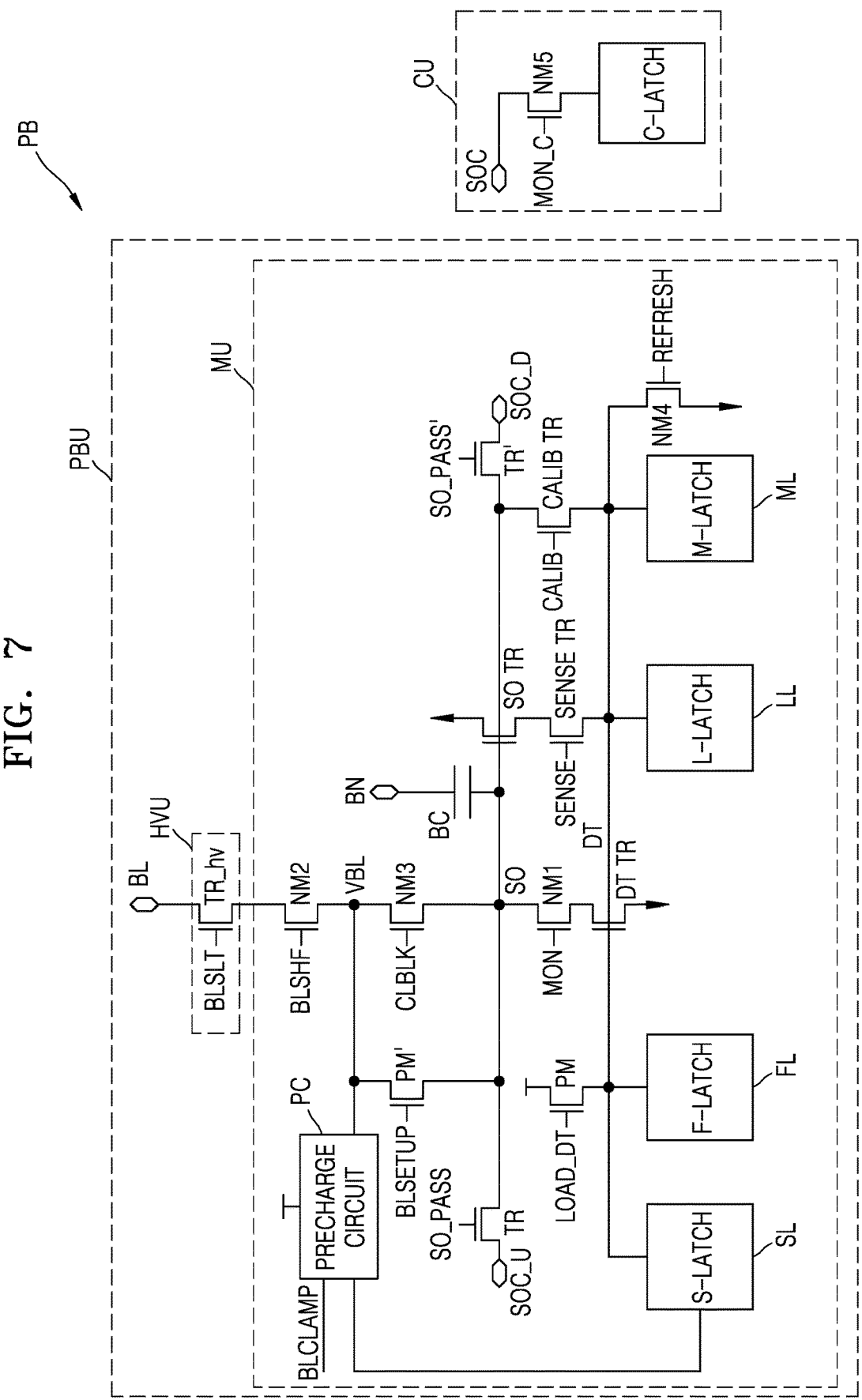
FIG. 7 illustrates a page buffer according to an embodiment.

FIG. 7 illustrates the page buffer PB in detail according to an embodiment.

The page buffer PB may correspond to the page buffer PB in FIG. 2. The page buffer PB may include a page buffer unit PBU and a cache unit CU. Because the cache unit CU includes a cache latch (C-LATCH), and the C-LATCH CL is connected to a data input/output line, the cache unit CU may be arranged adjacent to the data input/output line. Accordingly, the page buffer unit PBU may be apart from the cache unit CU, and the page buffer PB may have a structure in which the page buffer unit PBU is apart from the cache unit CU.

The page buffer unit PBU may include a main unit MU. The main unit MU may include main transistors in the page buffer PB. The page buffer unit PBU may further include a bit line selection transistor TR_hv which is connected to the bit line BL and driven by a bit line selection signal BLSLT. The bit line selection transistor TR_hv may be implemented as a high voltage transistor, and accordingly, the bit line selection transistor TR_hv may be arranged in a different well region from the main unit MU, that is, in a high voltage unit HVU.

The main unit MU may include a sensing latch (S-LATCH) SL, a force latch (F-LATCH) FL, an upper bit latch (M-LATCH) ML, and a lower bit latch (L-LATCH) LL. According to an embodiment, the S-LATCH SL, the F-LATCH FL, the M-LATCH ML, or the L-LATCH LL may be referred to as main latches. The main unit MU may further include a precharge circuit PC capable of controlling a precharge operation on the bit line BL or the sensing node SO based on a bit line clamping control signal BLCLAMP, and may further include a transistor PM' driven by a bit line setup signal BLSETUP. In some embodiments, the transistor PM' may precharge the sensing node SO to a precharge level in a precharge period. The precharge circuit PC may precharge a bit line voltage node VBL, and as a second transistor NM2 and the bit line selection transistor TR_hv are turned on, the voltage of the bit line voltage node VBL may be transmitted to the bit line BL.

The S-LATCH SL may store data stored in a memory cell or a sensing result of a threshold voltage of the memory cell, via a bit line connected to the memory cell during a reading (or read) or program verification operation. In addition, the S-LATCH SL may, during the program operation, be used to apply a program bit line voltage or a program inhibit voltage to the bit line BL. The F-LATCH FL may be used to improve the threshold voltage distribution during the program operation. The F-LATCH FL may store force data. After the force data is initially set to '1', the force data may be converted to '0' when the threshold voltage of the memory cell enters a forcing region in which the threshold voltage thereof is less than that in a target region. By utilizing the force data during a program execution operation, a bit line voltage may be controlled, and a program threshold voltage distribution may be formed to be narrow.

The M-LATCH ML, the L-LATCH LL, and the C-LATCH CL may be utilized to store data externally input during the program operation, and may be referred to as data latches. When data of 3 bits is programmed in one memory cell, the data of 3 bits may be respectively stored in the M-LATCH ML, the L-LATCH LL, and the C-LATCH CL. Until a program of the memory cell MC is completed, the M-LATCH ML, the L-LATCH LL, and the C-LATCH CL may respectively maintain the data stored therein. In addition, the C-LATCH CL may receive data read from the memory cell MC during the read operation, from the S-LATCH SL, and output the received data to the outside via the data input/output line.

In addition, the main unit MU may further include a first transistor NM1 and a data transfer transistor DT TR. The first transistor NM1 may be driven by a monitoring signal MON, and may connect the sensing node SO to a drain node of the data transfer transistor DT TR. In the data transfer transistor DT TR, the data transfer node DT may be connected to a gate terminal, and a power supply voltage (for example, VSS) may be connected to a source terminal.

In addition, the main unit MU may further include a second transistor NM2 and a third transistor NM3 which are connected to each other in series between the bit line selection transistor TR_hv and the sensing node SO. The second transistor NM2 may be driven by a bit line shut-off signal BLSHF, and the third transistor NM3 may be driven by a bit line connection control signal CLBLK.

The main unit MU may further include a fourth transistor NM4. The fourth transistor NM4 may be driven by a refresh signal REFRESH, and may provide a discharge path for flipping data values stored in the S-LATCH SL, the F-LATCH FL, the L-LATCH LL, and the M-LATCH ML.

The main unit MU may further include a pair of pass transistors connected to the sensing node SO, that is, a first pass transistor TR and a second pass transistor TR'. The first and second pass transistors TR and TR' may be driven according to a first sensing node path control signal SO_PASS and a second sensing node path control signal SO_PASS'. The first sensing node path control signal SO_PASS and the second sensing node path control signal SO_PASS' may have different logic levels. The first pass transistor TR may be connected between a first terminal SOC_U and the sensing node SO, and the second pass transistor TR' may be connected between the sensing node SO and a second terminal SOC_D.

For example, when the page buffer unit PBU is a second page buffer unit PBU1 in FIG. 6, the first terminal SOC_U may be connected to one end of a pass transistor included in the first page buffer unit PBU0, and the second terminal SOC_D may be connected to one end of a pass transistor included in a third page buffer unit PBU2. In this manner, the sensing node SO may be electrically connected to the combined sensing node SOC, via pass transistors included in each of the third through $(n+1)^{th}$ page buffer units PBU2 through PBUn.

During the program operation, the page buffer PB may verify whether the program in the memory cell MC selected among the memory cells MC included in the NAND string connected to the bit line BL is completed. The page buffer PB may store data, sensed by using the bit line BL during the program verification operation, in the S-LATCH SL. The M-LATCH ML and the L-LATCH LL, in which target data is stored according to the sensed data stored in the s-latch SL, may be set. For example, when the sensed data indicates that the program is completed, the m-LATCH ML and the l-LATCH LL may be switched to a program inhibit setup for the selected memory cell MC in a subsequent program loop. The C-LATCH CL may temporarily store input data provided from the outside. During the program operation, the target data to be stored in the C-LATCH CL may be stored in the M-LATCH ML and the L-LATCH LL.

The main unit MU may further include a precharge transistor PM, a sensing node transistor SO TR, a sense transistor SENSE TR, and a calibration transistor CALIB TR. The precharge transistor PM may be connected to the data transfer node DT, driven by a load signal LOAD_DT, and precharge the data transfer node DT in the precharge period. The sensing node transistor SO_TR may provide a discharge path for flipping a data value of the sensing latch SL according to a voltage level of the sensing node SO as the sensing node SO is connected to a gate terminal. In the inventive concept, the threshold voltage of the sensing node transistor SO_TR may be referred to as a sensing trip. The sense transistor SENSE_TR may be driven according to the sensing signal SENSE, and may connect the data transfer node DT to the sensing node transistor SO_TR. A calibration transistor CALIB TR may connect the sensing node SO to the data transfer node DT, and may be driven according to a calibration signal CALIB.

The sensing node SO may be connected to the boost node BN via a boost capacitor BC. By adjusting the boost voltage (for example, Vol_B in FIG. 2) applied to the boost node BN, the sensing node SO may be boosted up (e.g., voltage at SO may be increased when a higher boost voltage is applied) or boosted down (e.g., voltage at SO may be decreased when a lower boost voltage is applied).

The cache unit CU may include a fifth transistor NM5. The fifth transistor NM5 may be driven by a cache monitoring signal MON_C, and may connect the combined sensing node SOC to the cache latch C-LATCH.

Figure 8:
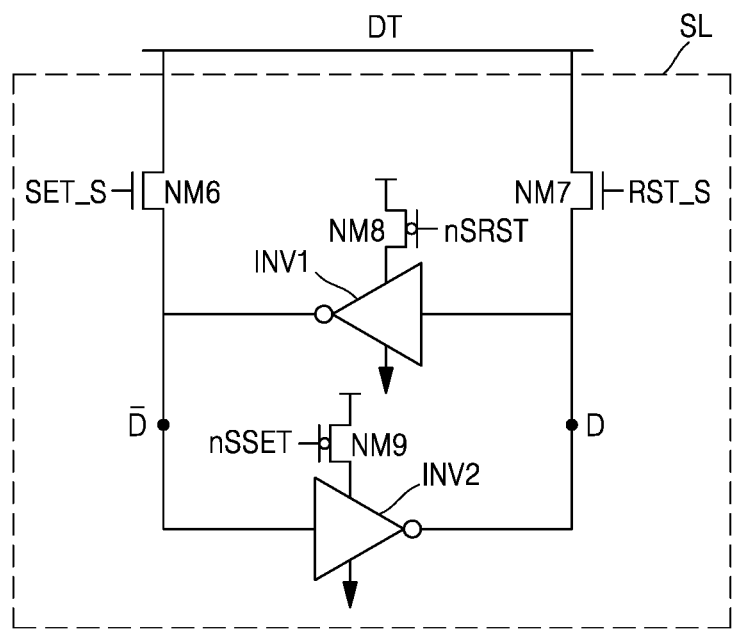
FIG. 8 is a circuit diagram of a sensing latch according to an embodiment.

FIG. 8 is a circuit diagram of sensing latch SL according to an embodiment.

Referring to FIG. 8, the S-LATCH SL may include a first inverter INV1, a second inverter INV2, and sixth through ninth transistors NM6 through NM9.

An output terminal of the first inverter INV1 may be connected to an input terminal of the second inverter INV2, and an input terminal of the first inverter INV1 may be connected to an output terminal of the second inverter INV2, and then, the first and second inverters INV1 and INV2 may operate as latches. An output node of the first inverter INV1 may be $\overline{D}$, and an output node of the second inverter INV2 may be D.

The seventh transistor NM7 may be connected to the input terminal of the first inverter INV1, and the sixth transistor NM6 may be connected to the input terminal of the second inverter INV2. A set signal SET_S may be provided to a gate terminal of the sixth transistor NM6, and a reset signal RST_S may be provided to a gate terminal of the seventh transistor NM7.

The eighth transistor NM8 may be driven by an nSRST signal and provide a precharge path to the first inverter INV1, and the ninth transistor NM9 may be driven by an nSSET signal and provide a precharge path to the second inverter INV2. The sixth transistor NM6 and the seventh transistor NM7 may be an N-type transistor and the eighth transistor NM8 and the ninth transistor NM9 may be a P-type transistor. It is clear from signal terms that nSSET signal may have an inverted value of the set signal SET_S and nSRST signal may have an inverted value of the reset signal RST_S.

Referring to FIGS. 7 and 8, when the voltage level of the sensing node SO is greater than the threshold voltage of the sensing node transistor SO_TR, the discharge path may be formed via the sensing node transistor SO_TR in the data transfer node DT. When the seventh transistor NM7 is turned on while the data value of the output node D is set to '1', the output node D may be discharged via the data transfer node DT. Accordingly, the data value of the output node D may be flipped to '0'. Because the ninth transistor NM9 provides a current to the output node D, the ninth transistor NM9 may interfere with the flipping of the data value of the output node D.

The page buffer circuit 240 according to an embodiment of the inventive concept may improve the data sensing speed of the S-LATCH SL by turning off the ninth transistor NM9, when the voltage level of the sensing node SO is greater than the threshold voltage of the sensing node transistor SO_TR.

Figure 9:
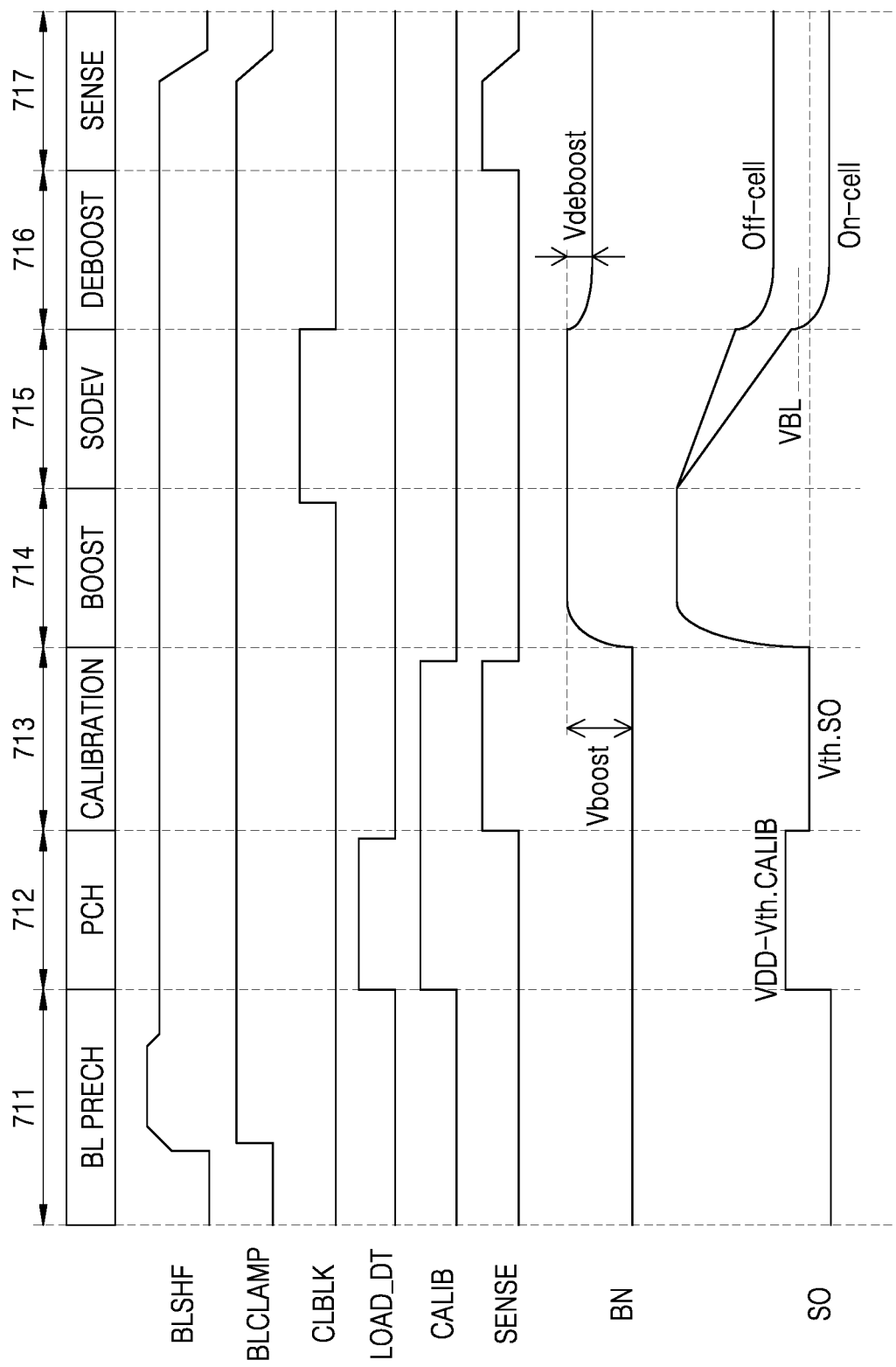
FIG. 9 is a timing diagram of a sensing operation according to an embodiment.
Figure 10:
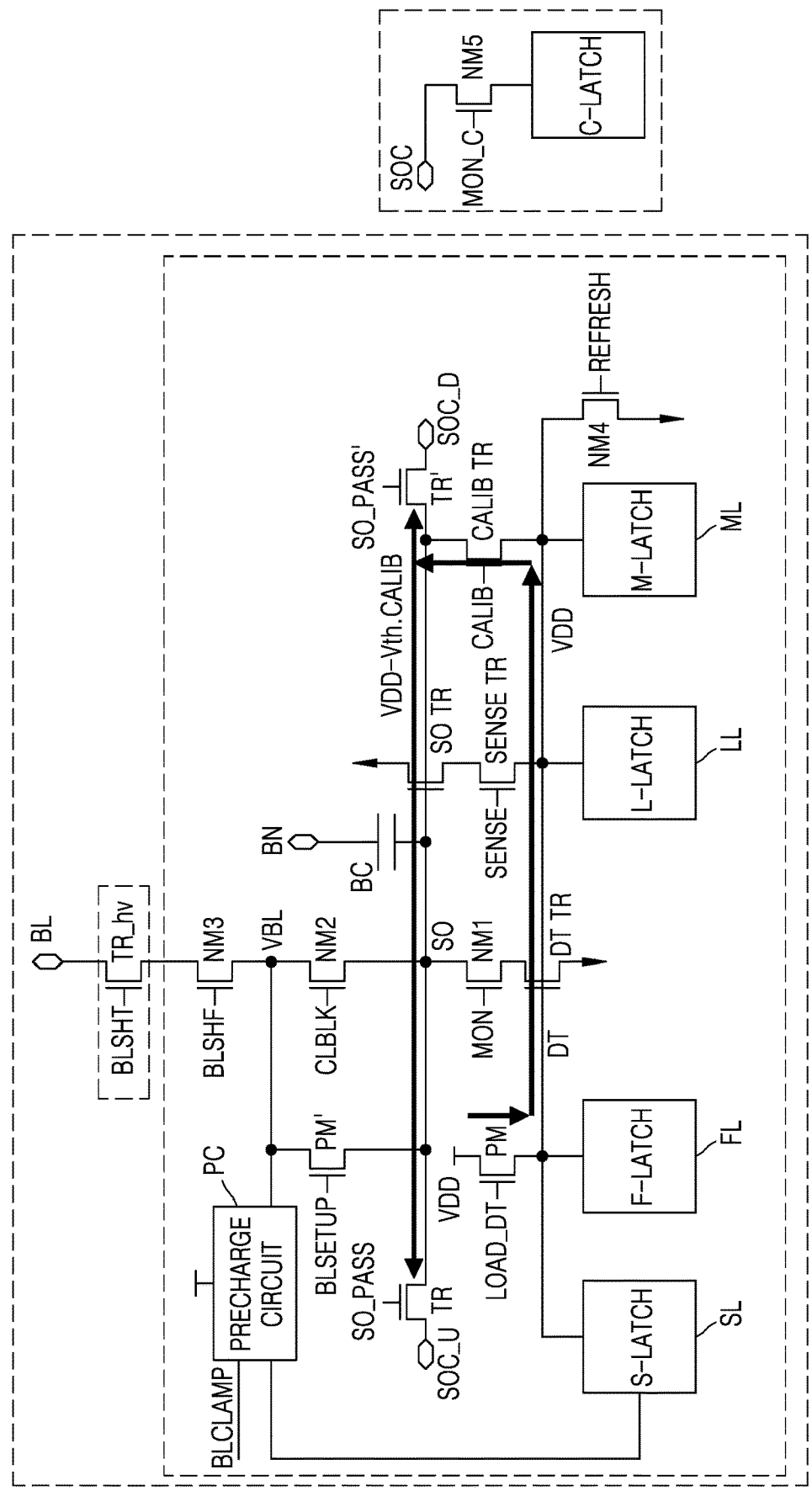
FIG. 10 is a circuit diagram of a sensing node-data transfer node precharge period according to an embodiment.
Figure 11:
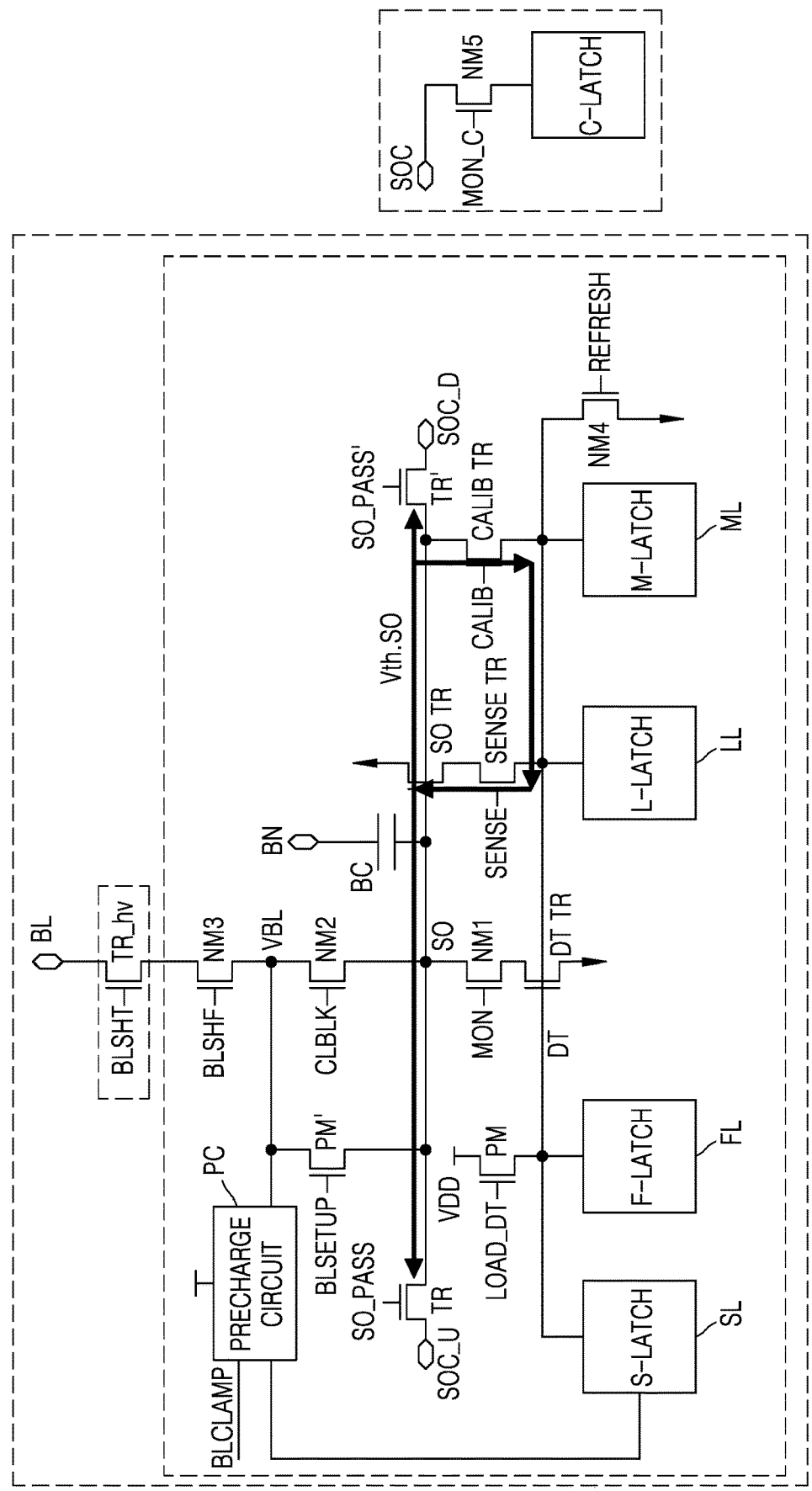
FIG. 11 is a circuit diagram of a calibration period according to an embodiment.

FIG. 9 is a timing diagram of a sensing operation according to an embodiment. FIG. 10 is a circuit diagram of a sensing node and data transfer node precharge period (PCH) 712 according to an embodiment, and FIG. 11 is a circuit diagram of a calibration period (CALIBRATION) 713 according to an embodiment.

Referring to FIG. 9, the sensing operation may include a bit line precharge period (BL PRECH) 711, in which the voltage of the bit line BL is precharged to the precharge level, the PCH 712, in which the voltage of the data transfer node DT is precharged to the precharge level, the CALIBRATION 713, in which the voltage level of the sensing node SO is set to the threshold voltage of the sensing node transistor SO_TR, a boost period (BOOST) 714, in which the voltage level of the sensing node SO is boosted up (e.g., an additional, increased boost voltage is applied to a boost node), a development period (SODEV) 715, in which the voltage of the sensing node SO is developed by electrically connecting the bit line BL to the sensing node SO, a deboost period (DEBOOST) 716, in which the voltage level of the sensing node SO is boosted down (e.g., a lower voltage than the previously-applied boost voltage is applied to the boost node to reduce the voltage at sensing node SO, which may still result in a boosted voltage in some embodiments, but a reduced boosted voltage), and a sensing period (SENSE) 717, in which the voltage of the sensing node SO is sensed.

In the BL PRECH 711, the bit line BL may be precharged based on a bit line shut off signal BLSHF and a bit line clamping control signal BLCLAMP. The precharge circuit PC may precharge the bit line voltage node VBL, and the voltage of the bit line voltage node VBL may be provided to the bit line BL.

In the PCH 712, the sensing node SO may be precharged based on the load signal LOAD_DT and the calibration signal CALIB. Referring to FIGS. 9 and 10, as a transistor PM is turned on according to the load signal LOAD_DT, the data transfer node DT may be precharged to a power supply voltage (for example, VDD). In addition, as the calibration transistor CALIB_TR is turned on according to the calibration signal CALIB, the sensing node SO may be precharged to a voltage level corresponding to a difference between the power supply voltage VDD of the sensing node SO and a threshold voltage Vth.CALIB of the calibration transistor CALIB_TR. Therefore, the sensing node SO may be precharged via a first path which is formed by the transistor PM, the data transfer node DT, the calibration transistor CALIB_TR, and the sensing node SO.

In the CALIBRATION 713, the voltage level of the sensing node SO may be set based on the calibration signal CALIB and a sense signal SENSE. Referring to FIGS. 9 and 11, as the sense transistor SENSE_TR is turned on according to the sense signal SENSE and the calibration transistor CALIB_TR is turned on according to the calibration signal CALIB, the voltage levels of a drain terminal and a gate terminal of the sensing node transistor SO_TR may be the same. Accordingly, because the sensing node transistor SO_TR is diode-connected, the voltage difference between the gate terminal and the source terminal may be the threshold voltage Vth.SO. For example, the voltage of the sensing node SO may be set to the threshold voltage Vth.SO via a path formed by the sensing node SO, the calibration transistor CALIB_TR, the data transfer node DT, and the sense transistor SENSE_TR.

In the BOOST 714, the voltage level of the boost node BN may be increased by a first level Vboost. The sensing node SO connected to the boost node BN via the boost capacitor BC may be boosted up.

In the SODEV 715, the voltage level of the sensing node SO may be developed based on a bit line connection control signal CLBLK. The voltage level of the sensing node SO may be decreased by connecting the sensing node SO to the bit line voltage node VBL. When the memory cell MC connected to the bit line BL is an on-cell, because the cell current is large, the voltage level of the sensing node SO may be relatively largely reduced, and when the memory cell MC connected to the bit line BL is an off-cell, because the cell current is small, the voltage level of the sensing node SO may be relatively less reduced. The voltage level of the bit line voltage node VBL may be maintained by using the precharge circuit PC. In the DODEV 715, the voltage level of the sensing node SO may be greater than the voltage level of the bit line voltage node VBL. Accordingly, even when the memory cell MC connected to the bit line BL is an on-cell, the voltage level of the sensing node SO may be greater than the voltage level of the bit line voltage node VBL.

In the DEBOOST 716, the voltage level of the boost node BN may decrease by a second level Vdeboost. The sensing node SO connected to the boost node BN via the boost capacitor BC may be boosted down. The magnitude of the first level Vboost may be greater than the magnitude of the second level Vdeboost.

In the SENSE 717, the data value of the S-LATCH SL may be flipped according to the level of the sensing node SO based on the sense signal SENSE. As the sense transistor SENSE_TR is turned on by the sense signal SENSE, the sensing node transistor SO_TR may be connected to the data transfer node DT. When the voltage level of the sensing node SO is greater than the sensing trip level, that is, the threshold voltage of the sensing node transistor SO_TR, a path, through which the data value of the S-LATCH SL is discharged, may be formed by using the data transfer node DT, the sense transistor SENSE_TR, and the sensing node transistor SO_TR.

Figure 12:
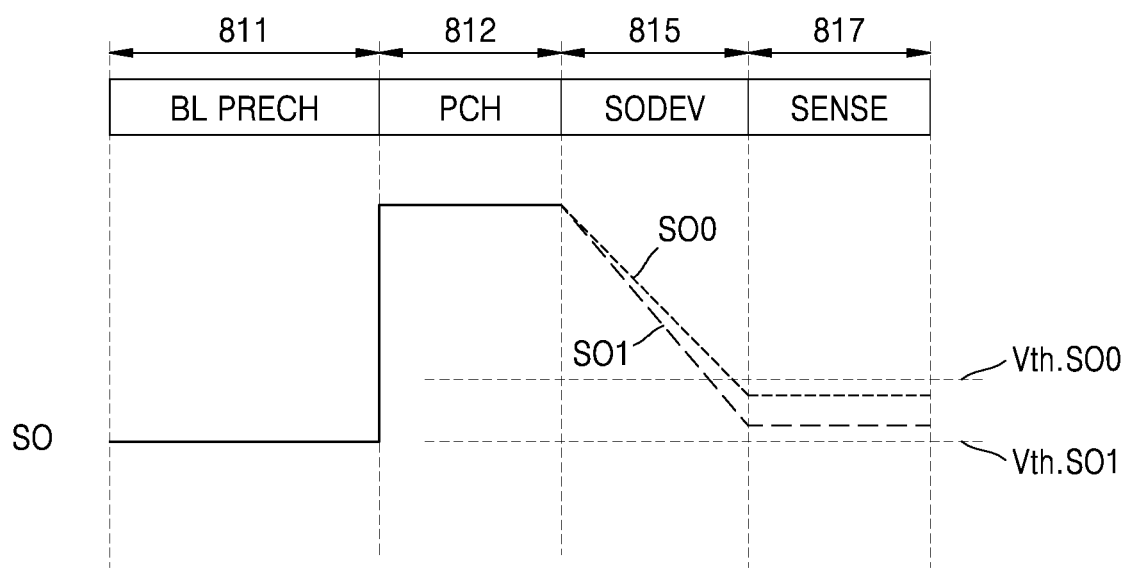
FIG. 12 is a timing diagram of an sensing operation on a plurality of page buffer units, according to a comparison example.

FIG. 12 is a timing diagram of an sensing operation on the plurality of page buffer units, according to a comparison example. FIG. 12 is described below with reference to FIG. 6.

Referring to FIG. 12, a first sensing node SO0 may be included in a first page buffer unit PBU0, and a second sensing node SO1 may be included in the second page buffer unit PBU1. Only the first and second sensing nodes SO0 and SO1 are illustrated in FIG. 12, but the embodiments are not limited thereto. The sensing operation may include a bit line precharge period 811, a sensing node precharge period 812, a development period 815, and a sensing period 817.

In the bit line precharge period 811, the bit line BL may be precharged, and in the sensing node precharge period 812, the first and second sensing nodes SO0 and SO1 may be precharged to the same level. For example, the first and second sensing nodes SO0 and SO1 may be precharged with the threshold voltage deviation of the sensing node transistor SO_TR being calibrated.

In the development period 815, the voltage levels of the first and second sensing nodes SO0 and SO1 may be decreased by connecting the first and second sensing nodes SO0 and SO1 to corresponding bit lines BL. Because the cell current of the memory cell MC connected to the first page buffer unit PBU0 is similar to the cell current of the second page buffer unit PBU1, at the termination time point of the development period 815, the voltage levels of the first and second sensing nodes SO0 and SO1 may be similar to each other.

In the sensing period 817, the voltage level of the first sensing node SO0 may be less than the threshold voltage Vth. SO0 of the sensing node transistor SO_TR included in the first page buffer unit PBU0. On the other hand, the voltage level of the second sensing node SO1 may be greater than a threshold voltage Vth. SO1 of the sensing node transistor SO_TR included in the second page buffer unit PBU1. Accordingly, a memory cell MC connected to the first page buffer unit PBU0 may be determined as an on-cell, and the memory cell MC connected to the second page buffer unit PBU1 may be determined as an off-cell.

According to a comparison example, because when a sensing node is pre-charged, the sensing node is pre-charged without calibrating a threshold voltage deviation of sensing node transistors, determinations of on-off of memory cells having the same cell current may vary for each page buffer unit. Accordingly, a distribution width of a threshold voltage distribution formed by a threshold voltage of the memory cells may increase.

Figure 13:
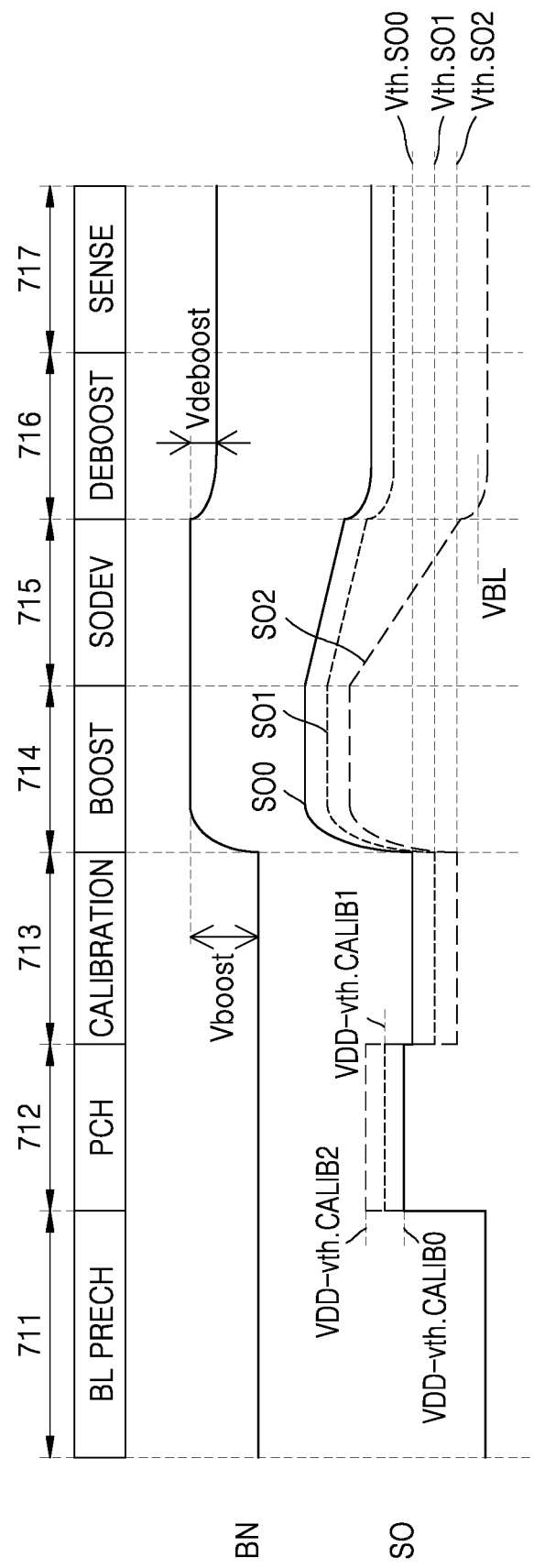
FIG. 13 is a timing diagram of an sensing operation on a plurality of page buffer units, according to an embodiment.

FIG. 13 is a timing diagram of a sensing operation on the plurality of page buffer units, according to an embodiment. FIG. 13 is described below with reference to FIG. 6.

Referring to FIG. 13, the first sensing node SO0 may be included in the first page buffer unit PBU0, the second sensing node SO1 may be included in the second page buffer unit PBU1, and a third sensing node SO2 may be included in the third page buffer unit PBU2.

The boost node BN may be included in each of the first through third page buffer units PBU0 through PBU2 or shared by at least two page buffer units.

In the PCH 712, the first through third sensing nodes SO0 through SO2 may be precharged to the voltage level according to the threshold voltage of the calibration transistor CALIB_TR included in each page buffer unit. The first sensing node SO0 may be precharged to the voltage level corresponding to a difference between the power supply voltage VDD and a threshold voltage vth.CALIB0 of the calibration transistor CALIB_TR included in the first page buffer unit PBU0. The second sensing node SO1 may be precharged to the voltage level corresponding to a difference between the power supply voltage VDD and a threshold voltage vth.CALIB1 of the calibration transistor CALM TR included in the second page buffer unit PBU1. The third sensing node SO2 may be precharged to the voltage level corresponding to a difference between the power supply voltage VDD and a threshold voltage vth.CALIB2 of the calibration transistor CALIB_TR included in the third page buffer unit PBU2. A power supply voltage is not limited to the power supply voltage VDD. For example, threshold voltages of the calibration transistors CALM TR may be different due to process deviation, and in the PCH 712, the first through third sensing nodes SO0 through SO2 may be precharged to different levels.

In the CALIBRATION 713, the first through third sensing nodes SO0 through SO2 may be set to the threshold voltage level of the sensing node transistor SO_TR included in each page buffer unit. The first sensing node SO0 may be precharged to the threshold voltage level Vth. SO0 of the sensing node transistor SO_TR included in the first page buffer unit PBU0. The second sensing node SO1 may be precharged to the threshold voltage level Vth.SO1 of the sensing node transistor SO_TR included in the second page buffer unit PBU1. The third sensing node SO2 may be precharged to the threshold voltage level Vth. SO2 of the sensing node transistor SO_TR included in the third page buffer unit PBU2. Due to process deviation, threshold voltages of sensing node transistors may be different from each other.

In the BOOST 714, the first through third sensing nodes SO0 through SO2 may be boosted up. In other words, the first through third sensing nodes SO0 through SO2 may not be precharged to the same voltage level, but at a voltage level due to boost-up, may be precharged to the voltage level calibrated by the threshold voltage level of the sensing node transistor SO_TR.

Accordingly, unlike as in the comparison example of FIG. 12, for the plurality of page buffer units, an on-off determination on the memory cells MC having the same cell current may be consistent. Accordingly, a distribution width of a threshold voltage distribution formed by a threshold voltage of the memory cells may increase.

Figure 14:
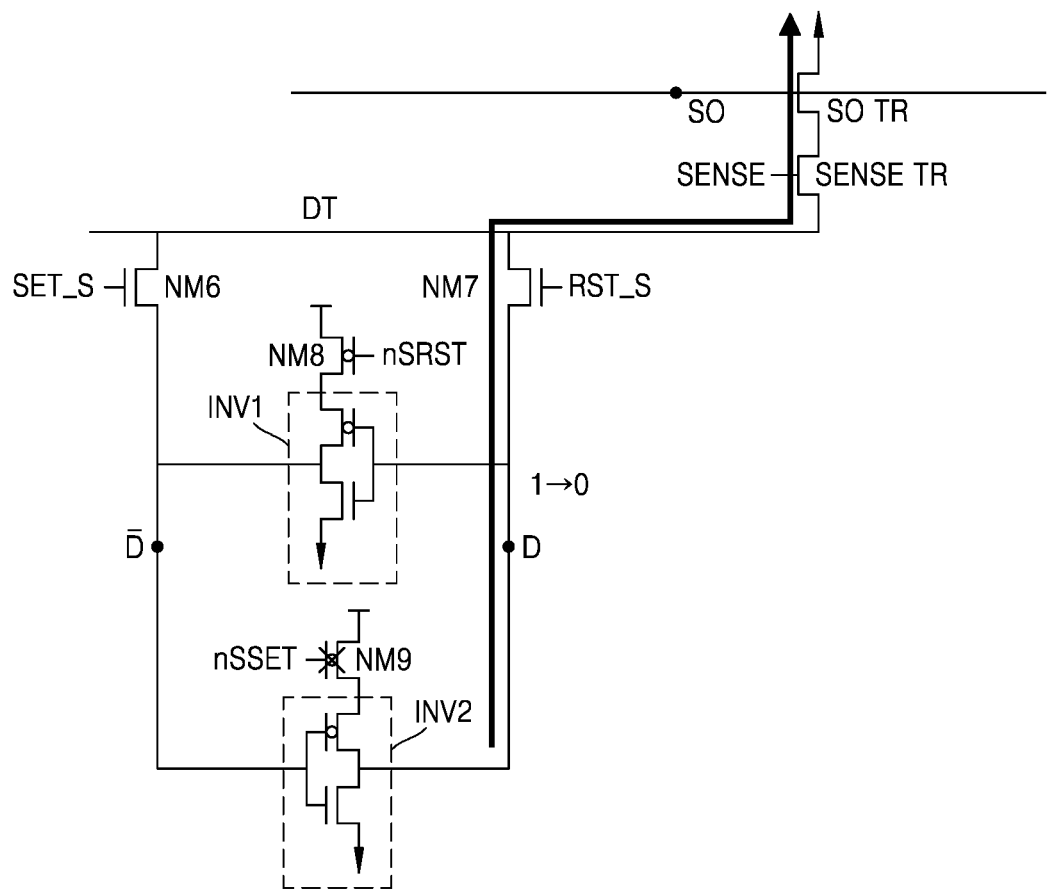
FIG. 14 is a diagram of a flip of a data value stored in a sensing latch, according to an embodiment.

FIG. 14 is a diagram of a flip of a data value stored in the S-LATCH SL, according to an embodiment.

Referring to FIGS. 7, 9, and 14, in the SENSE 717, when the voltage level of the sensing node SO is greater than the voltage level of the sensing trip, the D node value of the S-LATCH SL, which has been set to '1' in advance, may be flipped to '0'. In this case, when the ninth transistor NM9 is turned on, because the D node value is pulled up to '1', the speed, at which the D node value is flipped, may be reduced.

Thus, according to an embodiment of the inventive concept, when the data value of the S-LATCH SL is flipped, the sensing speed of the S-LATCH SL may be improved by turning off the ninth transistor NM9. Specifically, in the SENSE 717, the reset signal RST_S may be a high level, the set signal SET_S may be a low level. Accordingly, nSRST signal may be a low level, nSSET may be a high level, and the ninth transistor NM9 may be turned off. The embodiments are not limited thereto. As described in FIG. 14, the description for turning off the ninth transistor NM9 may be applied to the eighth transistor NM8.

Figure 15:
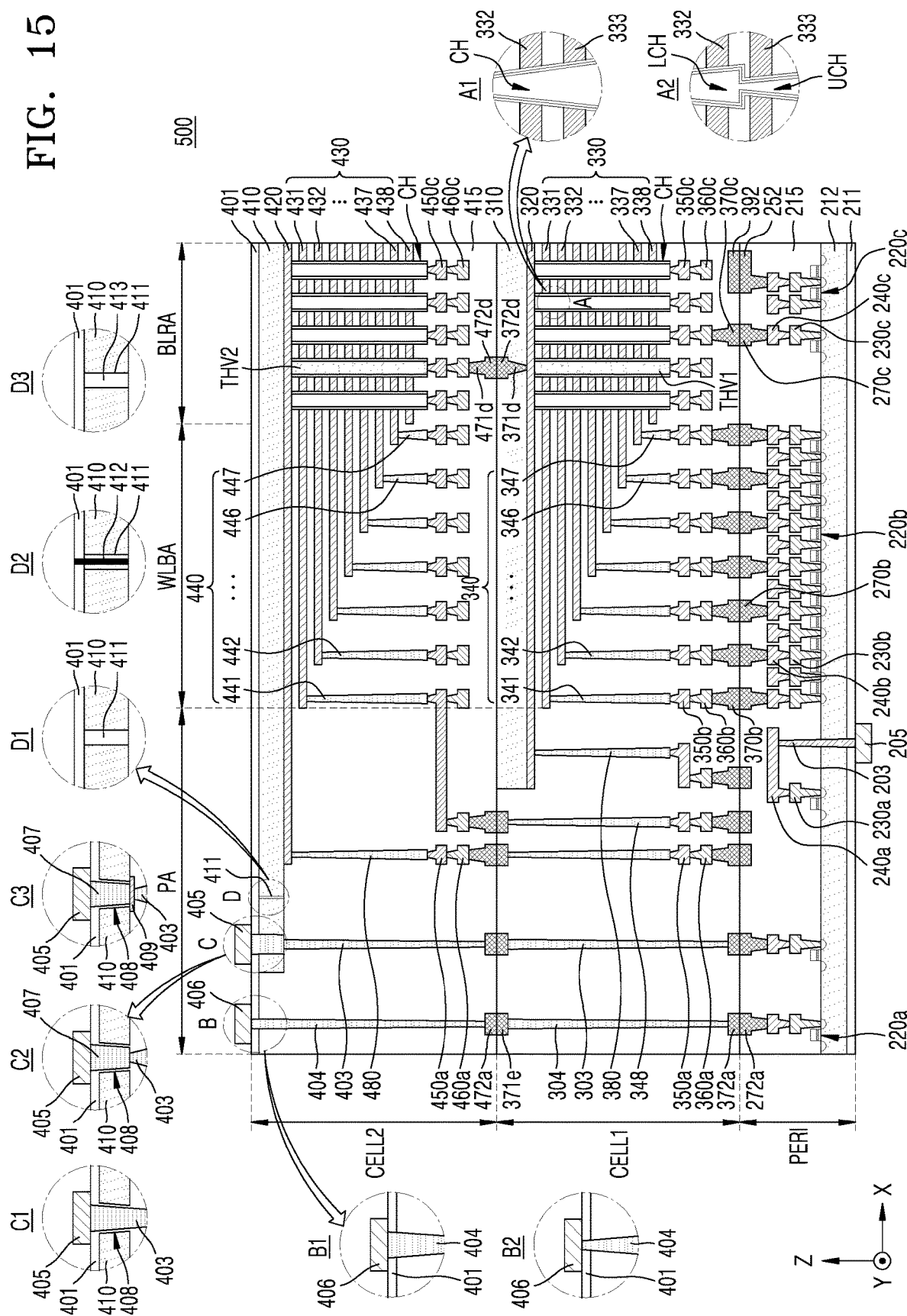
FIG. 15 is a diagram of a memory device according to an embodiment.

FIG. 15 is a view illustrating a memory device 500 according to an embodiment.

Referring to FIG. 15, the memory device 500 may have a chip-to-chip C2C structure. At least one upper chip including a cell region and a lower chip including a peripheral circuit region PERI may be manufactured separately, and then, the at least one upper chip and the lower chip may be connected to each other by using a bonding method to realize the C2C structure. For example, the bonding method may mean a method of electrically or physically connecting a bonding metal pattern formed in an uppermost metal layer of the upper chip to a bonding metal pattern formed in an uppermost metal layer of the lower chip. For example, when the bonding metal patterns include copper (Cu), the bonding method may include a Cu—Cu bonding method. Alternatively, the bonding metal patterns may include aluminum (Al) or tungsten (W).

The memory device 500 may include the at least one upper chip including the cell region. For example, as illustrated in FIG. 15, the memory device 500 may include two upper chips. However, the number of upper chips is not limited thereto. When the memory device 500 includes two upper chips, a first upper chip including a first cell region CELL1, a second upper chip including a second cell region CELL2, and the lower chip including the peripheral circuit region PERI may be manufactured separately, the first upper chip, the second upper chip, and the lower chip may be connected to each other by using the bonding method to manufacture the memory device 500. The first upper chip may be turned over and then may be connected to the lower chip by using the bonding method, and the second upper chip may also be turned over and then may be connected to the first upper chip by using the bonding method. Hereinafter, upper and lower portions of each of the first and second upper chips will be defined based on before each of the first and second upper chips is turned over. In other words, in FIG. 15, an upper portion of the lower chip may mean an upper portion defined based on a +Z-axis direction, and the upper portion of each of the first and second upper chips may mean an upper portion defined based on a −Z-axis direction. However, the embodiment is not limited thereto. In some embodiments, one of the first upper chip and the second upper chip may be turned over and then, may be connected to a corresponding chip by using the bonding method.

Each of the peripheral circuit region PERI and the first and second cell regions CELL1 and CELL2 of the memory device 500 may include an external pad bonding region PA, a word line bonding region WLBA, and a bit line bonding region BLBA.

The peripheral circuit region PERI may include a first substrate 212 and a plurality of circuit elements 220a, 220b and 220c formed on the first substrate 212. An interlayer insulating layer 215 including one or more insulating layers may be provided on the plurality of circuit elements 220a, 220b and 220c, and a plurality of metal lines electrically and respectively connected to the plurality of circuit elements 220a, 220b and 220c may be provided in the interlayer insulating layer 215. For example, a plurality of metal lines may include first metal lines 230a, 230b and 230c respectively connected to the plurality of circuit elements 220a, 220b and 220c, and second metal lines 240a, 240b and 240c respectively formed on the first metal lines 230a, 230b and 230c. The plurality of metal lines may include at least one of various conductive materials. For example, the first metal lines 230a, 230b and 230c may include tungsten having a relatively high electrical resistivity, and the second metal lines 240a, 240b and 240c may include Cu having a relatively low electrical resistivity.

The first metal lines 230a, 230b and 230c and the second metal lines 240a, 240b and 240c are illustrated and described in the present embodiment. However, the embodiment is not limited thereto. In some embodiments, at least one metal line may further be formed on the second metal lines 240a, 240b and 240c. In this case, the second metal lines 240a, 240b and 240c may include Al, and at least some of the additional metal lines formed on the second metal lines 240a, 240b and 240c may include Cu having an electrical resistivity lower than that of Al of the second metal lines 240a, 240b and 240c.

The interlayer insulating layer 215 may be arranged on the first substrate 212, and may include an insulating material, such as silicon oxide and/or silicon nitride.

Each of the first and second cell regions CELL1 and CELL2 may include at least one memory block. The first cell region CELL1 may include a second substrate 310 and a common source line 320. A plurality of word lines 330 (331 through 338) may be stacked on the second substrate 310 in a direction (that is, the Z-axis direction) perpendicular to an upper surface of the second substrate 310. String selection lines SSL and the ground selection line GSL may be arranged on and under the word lines 330, and the plurality of word lines 330 may be arranged between the string selection lines SSL and the ground selection line GSL.

Similarly, the second cell region CELL2 may include a third substrate 410 and a common source line 420, and a plurality of word lines 430 (431 through 438) may be stacked on the third substrate 410 in a direction (that is, the Z-axis direction) perpendicular to an upper surface of the third substrate 410. Each of the second substrate 310 and the third substrate 410 may include at least one of various materials, for example, a silicon substrate, a silicon-germanium substrate, a germanium substrate, or a substrate having a single-crystalline epitaxial layer grown on a single-crystalline silicon substrate. A plurality of channel structures CH may be formed in each of the first and second cell regions CELL1 and CELL2.

In some embodiments, as illustrated in region 'A1', the channel structure CH may be provided in the bit line bonding region BLBA, and may extend in the direction perpendicular to the upper surface of the second substrate 310 to penetrate the plurality of word lines 330, the string selection lines SSL, and the ground selection line GSL. The channel structure CH may include a data storage layer, a channel layer, and a buried insulating layer. The channel layer may be electrically connected to a first metal line 350c and a second metal line 360c in the bit line bonding region BLBA. For example, the second metal line 360c may include the bit line BL, and may be connected to the channel structure CH via the first metal line 350c. The second metal line 360c may extend in a first direction (that is, a Y-axis direction) parallel to the upper surface of the second substrate 310.

In some embodiments, as illustrated in region 'A2', the channel structure CH may include a lower channel LCH and an upper channel UCH, which are connected to each other. For example, the channel structure CH may be formed by using a process of forming the lower channel LCH and a process of forming the upper channel UCH. The lower channel LCH may extend in a direction perpendicular to the upper surface of the second substrate 310 to penetrate the common source line 320 and lower word lines 331 and 332. The lower channel LCH may include a data storage layer, a channel layer, and a buried insulating layer, and may be connected to the upper channel UCH. The upper channel UCH may penetrate upper word lines 333 through 338. The upper channel UCH may include a data storage layer, a channel layer, and a buried insulating layer, and the channel layer of the upper channel UCH may be electrically connected to the first metal line 350c and the second metal line 360c. As the length of a channel increases, due to characteristics of manufacturing processes, it may be difficult to form a channel having a substantially uniform width. The memory device 500 according to the present embodiment may include a channel having improved width uniformity due to the lower channel LCH and the upper channel UCH which are formed by the using sequentially performed processes.

When the channel structure CH includes the lower channel LCH and the upper channel UCH as illustrated in the region 'A2', a word line adjacent to a boundary between the lower channel LCH and the upper channel UCH may include a dummy word line. For example, the lower word line 332 and the upper word line 333 adjacent to the boundary between the lower channel LCH and the upper channel UCH may include the dummy word lines. In this case, data may not be stored in memory cells MC connected to the dummy word line. Alternatively, the number of pages corresponding to the memory cells MC connected to the dummy word line may be less than the number of pages corresponding to the memory cells MC connected to a general word line. A level of the voltage applied to the dummy word line may be different from a level of the voltage applied to the general word line, and thus, it may be possible to reduce an influence of a non-uniform channel width between the lower and upper channels LCH and UCH in an operation of a memory device.

On the other hand, the number of lower word lines 331 and 332 penetrated by the lower channel LCH may be less than the number of upper word lines 333 to 338 penetrated by the upper channel UCH in the region 'A2'. However, the embodiment is not limited thereto. In some embodiments, the number of lower word lines penetrated by the lower channel LCH may be equal to or greater than the number of upper word lines penetrated by the upper channel UCH. In addition, structural features and a connection relation of the channel structure CH arranged in the second cell region CELL2 may be substantially the same as those of the channel structure CH arranged in the first cell region CELL1.

In the bit line bonding region BLBA, a first through-electrode THV1 may be provided in the first cell region CELL1, and a second through-electrode THV2 may be provided in the second cell region CELL2. As illustrated in FIG. 15, the first through-electrode THV1 may penetrate the common source line 320 and the plurality of word lines 330. In some embodiments, the first through-electrode THV1 may further penetrate the second substrate 310. The first through-electrode THV1 may include a conductive material. Alternatively, the first through-electrode THV1 may include a conductive material surrounded by an insulating material. The second through-electrode THV2 may have the same shape and structure as the first through-electrode THV1.

In some embodiments, the first through-electrode THV1 and the second through-electrode THV2 may be electrically connected to each other via a first through-metal pattern 372d and a second through-metal pattern 472d. The first through-metal pattern 372d may be formed at a lower end of the first upper chip including the first cell region CELL1, and the second through-metal pattern 472d may be formed at an upper end of the second upper chip including the second cell region CELL2. The first through-electrode THV1 may be electrically connected to the first metal line 350c and the second metal line 360c. A lower via 371d may be formed between the first through-electrode THV1 and the first through-metal pattern 372d, and an upper via 471d may be formed between the second through-electrode THV2 and the second through-metal pattern 472d. The first through-metal pattern 372d and the second through-metal pattern 472d may be connected to each other by using the bonding method.

In addition, in the bit line bonding region BLBA, an upper metal pattern 252 may be formed in an uppermost metal layer of the peripheral circuit region PERI, and an upper metal pattern 392 having the same shape as the upper metal pattern 252 may be formed in an uppermost metal layer of the first cell region CELL1. The upper metal pattern 392 of the first cell region CELL1 and the upper metal pattern 252 of the peripheral circuit region PERI may be electrically connected to each other by using the bonding method. In the bit line bonding region BLBA, the bit line 360c may be electrically connected to a page buffer included in the peripheral circuit region PERI. For example, some of the circuit elements 220c of the peripheral circuit region PERI may constitute the page buffer PB, and the bit line 360c may be electrically connected to the circuit elements 220c constituting the page buffer PB via an upper bonding metal pattern 370c of the first cell region CELL1 and an upper bonding metal pattern 270c of the peripheral circuit region PERI.

Referring to FIG. 15 again, in the word line bonding region WLBA, the word lines 330 of the first cell region CELL1 may extend in a second direction (that is, an X-axis direction) parallel to the upper surface of the second substrate 310, and may be connected to a plurality of cell contact plugs 340 (341 through 347). First metal lines 350b and second metal lines 360b may be sequentially connected onto the cell contact plugs 340 connected to the word lines 330. In the word line bonding region WLBA, the cell contact plugs 340 may be connected to the peripheral circuit region PERI via upper bonding metal patterns 370b of the first cell region CELL1 and upper bonding metal patterns 270b of the peripheral circuit region PERI.

The cell contact plugs 340 may be electrically connected to a row decoder included in the peripheral circuit region PERI. For example, some of the circuit elements 220b of the peripheral circuit region PERI may constitute the row decoder 250, and the cell contact plugs 340 may be electrically connected to the circuit elements 220b constituting the row decoder 250 via the upper bonding metal patterns 370b of the first cell region CELL1 and the upper bonding metal patterns 270b of the peripheral circuit region PERI. In some embodiments, an operating voltage of the circuit elements 220b constituting the row decoder 250 may be different from an operating voltage of the circuit elements 220c constituting the page buffer PB. For example, the operating voltage of the circuit elements 220c constituting the page buffer PB may be greater than the operating voltage of the circuit elements 220b constituting the row decoder 250.

Similarly, in the word line bonding region WLBA, the word lines 430 of the second cell region CELL2 may extend in the second direction (that is, the X-axis direction) parallel to the upper surface of the third substrate 410, and may be connected to a plurality of cell contact plugs 440 (441 through 447). The cell contact plugs 440 may be connected to the peripheral circuit region PERI via an upper metal pattern of the second cell region CELL2, lower and upper metal patterns, and a cell contact plug 348 of the first cell region CELL1.

In the word line bonding region WLBA, the upper bonding metal patterns 370b may be formed in the first cell region CELL1, and the upper bonding metal patterns 270b may be formed in the peripheral circuit region PERI. The upper bonding metal patterns 370b of the first cell region CELL1 and the upper bonding metal patterns 270b of the peripheral circuit region PERI may be electrically connected to each other by using the bonding method. The upper bonding metal patterns 370b and the upper bonding metal patterns 270b may include Al, Cu, or W.

In the external pad bonding region PA, a lower metal pattern 371e may be formed in a lower portion of the first cell region CELL1, and an upper metal pattern 472a may be formed in an upper portion of the second cell region CELL2. The lower metal pattern 371e of the first cell region CELL1 and the upper metal pattern 472a of the second cell region CELL2 may be connected to each other by using the bonding method in the external pad bonding region PA. Similarly, an upper metal pattern 372a may be formed in an upper portion of the first cell region CELL1, and an upper metal pattern 272a may be formed in an upper portion of the peripheral circuit region PERI. The upper metal pattern 372a of the first cell region CELL1 and the upper metal pattern 272a of the peripheral circuit region PERI may be connected to each other by using the bonding method.

Common source line contact plugs 380 and 480 may be arranged in the external pad bonding region PA. The common source line contact plugs 380 and 480 may include a conductive material, such as a metal, a metal compound, and doped polysilicon. The common source line contact plug 380 of the first cell region CELL1 may be electrically connected to the common source line 320, and the common source line contact plug 480 of the second cell region CELL2 may be electrically connected to the common source line 420. A first metal line 350a and a second metal line 360a may be sequentially stacked on the common source line contact plug 380 of the first cell region CELL1, and a first metal line 450a and a second metal line 460a may be sequentially stacked on the common source line contact plug 480 of the second cell region CELL2.

Input/output pads 205, 405 and 406 may be arranged in the external pad bonding region PA. Referring to FIG. 15, a lower insulating layer 211 may cover a lower surface of the first substrate 212, and a first input/output pad 205 may be formed on the lower insulating layer 211. The first input/output pad 205 may be connected to at least one of a plurality of the circuit elements 220a arranged in the peripheral circuit region PERI via a first input/output contact plug 203, and may be separated from the first substrate 212 by the lower insulating layer 211. In addition, a side insulating layer may be arranged between the first input/output contact plug 203 and the first substrate 212 to electrically isolate the first input/output contact plug 203 from the first substrate 212.

An upper insulating layer 401 covering an upper surface of the third substrate 410 may be formed on the third substrate 410. A second input/output pad 405 and/or a third input/output pad 406 may be arranged on the upper insulating layer 401. The second input/output pad 405 may be connected to at least one of the plurality of circuit elements 220a arranged in the peripheral circuit region PERI via second input/output contact plugs 403 and 303, and the third input/output pad 406 may be connected to at least one of the plurality of circuit elements 220a arranged in the peripheral circuit region PERI via third input/output contact plugs 404 and 304.

In some embodiments, the third substrate 410 may not be arranged in a region in which the input/output contact plug is arranged. For example, as illustrated in region 'B', the third input/output contact plug 404 may be separated from the third substrate 410 in a direction parallel to the upper surface of the third substrate 410, and may penetrate an interlayer insulating layer 415 of the second cell region CELL2 and may be connected to the third input/output pad 406. In this case, the third input/output contact plug 404 may be formed by using at least one of various processes.

In some embodiments, as illustrated in region 'B1', the third input/output contact plug 404 may extend in a third direction (that is, the Z-axis direction), and the diameter of the third input/output contact plug 404 may be progressively greater toward the upper insulating layer 401. In other words, the diameter of the channel structure CH described in the region 'A1' may be progressively less toward the upper insulating layer 401, but the diameter of the third input/output contact plug 404 may be progressively greater toward the upper insulating layer 401. For example, the third input/output contact plug 404 may be formed after the second cell region CELL2 and the first cell region CELL1 are bonded to each other by using the bonding method.

In some embodiments, as illustrated in region 'B2', the third input/output contact plug 404 may extend in the third direction (that is, the Z-axis direction), and the diameter of the third input/output contact plug 404 may be progressively less toward the upper insulating layer 401. In other words, like the channel structure CH, the diameter of the third input/output contact plug 404 may be progressively less toward the upper insulating layer 401. For example, the third input/output contact plug 404 may be formed together with the cell contact plugs 440 before the second cell region CELL2 and the first cell region CELL1 are bonded to each other.

In some embodiments, the third input/output contact plug 404 may overlap the third substrate 410. For example, as illustrated in region 'C', the second input/output contact plug 403 may penetrate the interlayer insulating layer 415 of the second cell region CELL2 in the third direction (that is, the Z-axis direction), and may be electrically connected to the second input/output pad 405 via the third substrate 410. In this case, a connection structure between the second input/output contact plug 403 and the second input/output pad 405 may be realized by using various methods.

In some embodiments, as illustrated in region 'C1', an opening 408 may penetrate the third substrate 410, and the second input/output contact plug 403 may be connected directly to the second input/output pad 405 via the opening 408 formed in the third substrate 410. In this case, as illustrated in region 'C1', the diameter of the second input/output contact plug 403 may be progressively greater toward the second input/output pad 405. However, the embodiment is not limited thereto, and in some embodiments, the diameter of the second input/output contact plug 403 may be progressively less toward the second input/output pad 405.

In some embodiments, as illustrated in region 'C2', an opening 408 penetrating the third substrate 410 may be formed, and a contact 407 may be formed in the opening 408. An end of the contact 407 may be connected to the second input/output pad 405, and another end of the contact 407 may be connected to the second input/output contact plug 403. Accordingly, the second input/output contact plug 403 may be electrically connected to the second input/output pad 405 via the contact 407 in the opening 408. In this case, as illustrated in the region 'C2', the diameter of the contact 407 may be progressively greater toward the second input/output pad 405, and the diameter of the second input/output contact plug 403 may be progressively less toward the second input/output pad 405. For example, the second input/output contact plug 403 may be formed together with the cell contact plugs 440 before the second cell region CELL2 and the first cell region CELL1 are bonded to each other, and the contact 407 may be formed after the second cell region CELL2 and the first cell region CELL1 are bonded to each other.

In some embodiments, as illustrated in region 'C3', a stopper 409 may further be formed on a lower end of the opening 408 of the third substrate 410, as compared with the embodiments of region 'C2'. The stopper 409 may include a metal line formed on the same layer as the common source line 420. Alternatively, the stopper 409 may include a metal line formed on the same layer as at least one of the word lines 430. The second input/output contact plug 403 may be electrically connected to the second input/output pad 405 via the contact 407 and the stopper 409.

Like the second and third input/output contact plugs 403 and 404 of the second cell region CELL2, the diameter of each of the second and third input/output contact plugs 303 and 304 of the first cell region CELL1 may be progressively less toward the lower metal pattern 371e or may be progressively greater toward the lower metal pattern 371e.

In some embodiments, a slit 411 may be formed in the third substrate 410. For example, the slit 411 may be formed at a certain position of the external pad bonding region PA. For example, as illustrated in region 'D', the slit 411 may be located between the second input/output pad 405 and the cell contact plugs 440 in a plan view. Alternatively, the second input/output pad 405 may be between the slit 411 and the cell contact plugs 440 in a plan view.

In some embodiments, as illustrated in region 'D1', the slit 411 may penetrate the third substrate 410. For example, the slit 411 may prevent the third substrate 410 from being finely cracked when the opening 408 is formed. However, the embodiment is not limited thereto, and in some embodiments, the slit 411 may be formed to have the depth ranging from about 60% to about 70% of the thickness of the third substrate 410.

In some embodiments, as illustrated in region 'D2', a conductive material 412 may be formed in the slit 411. For example, the conductive material 412 may discharge to the outside a leakage current occurring while driving the circuit elements in the external pad bonding region PA. In this case, the conductive material 412 may be connected to an external ground line.

In some embodiments, as illustrated in region 'D3', an insulating material 413 may be formed in the slit 411. For example, the insulating material 413 may be used to electrically isolate the second input/output pad 405 and the second input/output contact plug 403 arranged in the external pad bonding region PA from the word line bonding region WLBA. Because the insulating material 413 is formed in the slit 411, it may be possible to prevent a voltage provided via the second input/output pad 405 from affecting a metal layer on the third substrate 410 in the word line bonding region WLBA.

In some embodiments, the first, second, and third input/output pads 205, 405 and 406 may be selectively formed. For example, the memory device 500 may be implemented to include only the first input/output pad 205 on the first substrate 212, to include only the second input/output pad 405 on the third substrate 410, or to include only the third input/output pad 406 on the upper insulating layer 401.

In some embodiments, at least one of the second substrate 310 of the first cell region CELL1 and the third substrate 410 of the second cell region CELL2 may be used as a sacrificial substrate, and may be completely or partially removed before or after a bonding process. An additional layer may be stacked after the removal of the substrate. For example, the second substrate 310 of the first cell region CELL1 may be removed before or after the bonding process of the peripheral circuit region PERI and the first cell region CELL1, and then, an insulating layer covering an upper surface of the common source line 320 or a conductive layer for connection may be formed. Similarly, the third substrate 410 of the second cell region CELL2 may be removed before or after the bonding process of the first cell region CELL1 and the second cell region CELL2, and then, the upper insulating layer 401 covering an upper surface of the common source line 420 or a conductive layer for connection may be formed.

The memory cell array 210 in FIG. 2 may be arranged in the first cell region CELL1 and/or the second cell region CELL2. The peripheral circuit 201 in FIG. 2 may be in the peripheral circuit region PERI.

Figure 16:
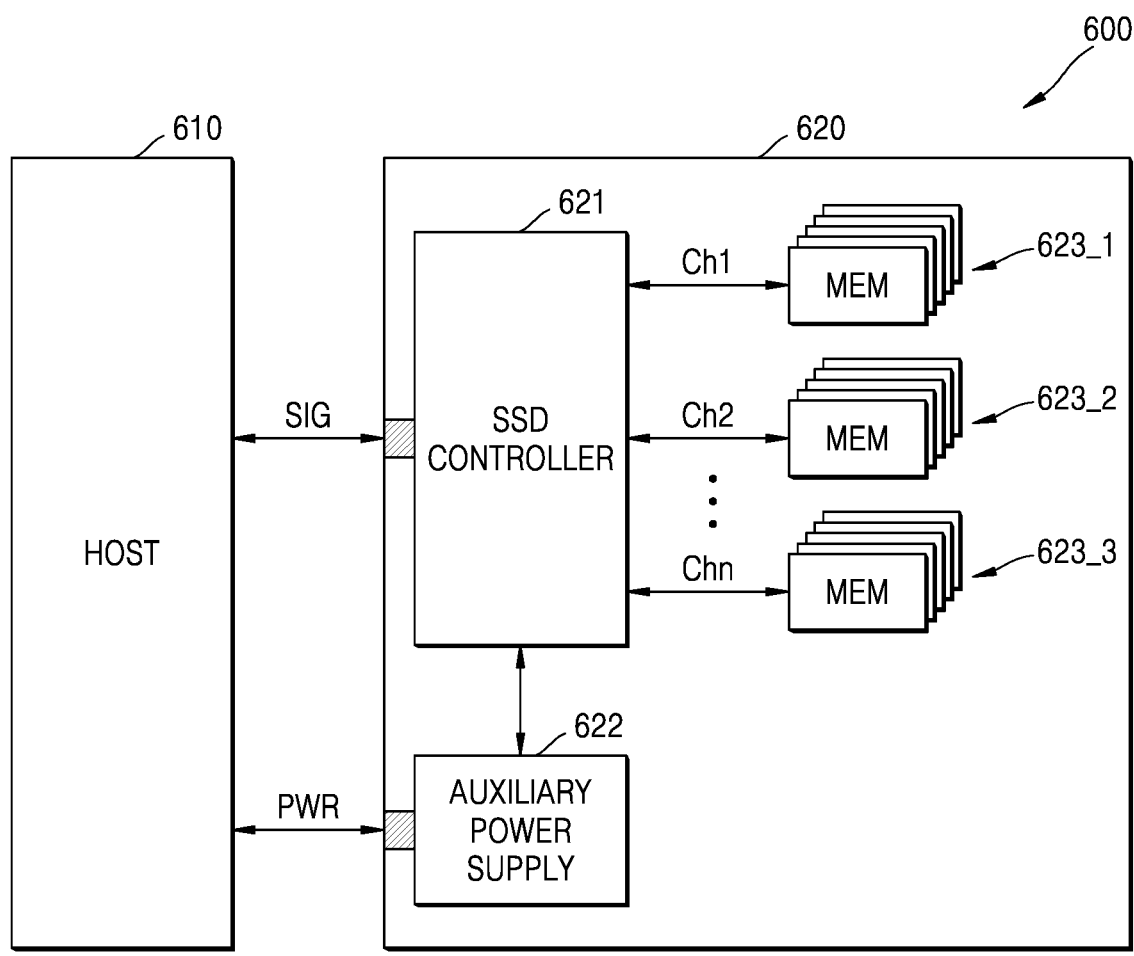
FIG. 16 is a block diagram of an example to which a memory device is applied to a solid state drive (SSD) system, according to an embodiment.

FIG. 16 is a block diagram of an example, to which a memory device is applied to an SSD system, according to an embodiment.

Referring to FIG. 16, the SSD system 600 may include a host 610 and an SSD 620. The SSD 620 may exchange signals with the host 610 via a signal connector, and receive a power supply via a power connector. The SSD 620 may include an SSD controller 621, an auxiliary power supply device 622, and memory devices 623_1 through 623_n. The memory devices 623_1 through 623_n may include vertically stacked NAND flash memory devices. In this case, the SSD 620 may be implemented by using the embodiments described above with reference to FIGS. 1 through 15. In other words, each of the memory devices 623_1 through 623_n provided in the SSD 620 may precharge the sensing node SO to the threshold voltage level of the sensing node transistor SO_TR and perform boost-up and boost-down operations on the sensing node SO, and may form a narrow threshold voltage distribution.

While the inventive concept has been particularly shown and described with reference to embodiments thereof, it will be understood that various changes in form and details may be made therein without departing from the spirit and scope of the following claims.

What is claimed is:

1. A memory device, comprising:
   a memory cell array including a plurality of memory cells; and
   a page buffer circuit including a plurality of page buffer units respectively connected to the memory cell array via a plurality of bit lines, the page buffer units each comprising a sensing node, a data transfer node, a first transistor configured to precharge the data transfer node, a second transistor having a drain connected to the sensing node and a source connected to the data transfer node, a sensing latch storing data sensed by the memory cell array and connected to the data transfer node, a third transistor configured to change a data value of the sensing latch according to a level of the sensing node, a fourth transistor connecting the third transistor to the data transfer node, and a boost node configured to boost up and boost down the sensing node during a sensing operation.

2. The memory device of claim 1, wherein the each of the plurality of page buffer units comprises a fifth transistor configured to change a level of the sensing node based on a level of the data transfer node, and a sixth transistor connecting the fifth transistor and the sensing node.

3. The memory device of claim 1, configured such that during the sensing operation, in a first time period, the sensing node is precharged in a state in which the first transistor and the second transistor are turned on and the fourth transistor is turned off, and in a second time period, a voltage of the sensing node is set to a threshold voltage according to a path through the data transfer node and the third transistor in a state in which the first transistor is turn off and the second transistor and the third transistor are turned on.

4. The memory device of claim 3, wherein:
   the memory device is configured such that, during the sensing operation, in a third time period, the voltage of the sensing node is boosted up as a voltage applied to the boost node is increased by a first voltage level, in a fourth time period, the sensing node is developed, in a fifth time period, the voltage of the sensing node is boosted down as the voltage applied to the boost node is decreased by a second voltage level, and in a sixth time period, a data value of the sensing latch is changed based on the voltage level of the sensing node.

5. The memory device of claim 4, wherein the first voltage level is greater than the second voltage level.

6. The memory device of claim 4, wherein, in the fourth time period, the developed voltage level of the sensing node is greater than a voltage level precharged to a respective bit line during the sensing operation.

7. The memory device of claim 4, wherein the sensing latch comprises:
   a first inverter and a second inverter cross coupled each other;
   a seventh transistor configured to supply a positive power supply to the first inverter;
   a eighth transistor configured to supply a positive power supply to the second inverter;
   a ninth transistor connecting the data transfer node to an output of the first inverter; and
   a tenth transistor connecting the data transfer node to an output of the second inverter,
   wherein, during the sixth time period, the data value of the sensing latch is changed in a first state in which the seventh transistor is turned on and the ninth transistor is turned off or a second state in which the eighth transistor is turned on and the tenth transistor is turned off.

8. The memory device of claim 4, wherein the voltage level of the sensing node included in the page buffer unit corresponding to an on-cell among the plurality of page buffer units is, in the sixth time period, less than a threshold voltage level of the third transistor, and
   wherein the voltage level of the sensing node included in the page buffer unit corresponding to an off-cell among the plurality of page buffer units is, in the sixth time period, greater than the threshold voltage level of the third transistor.

9. The memory device of claim 4, wherein, in the third through fifth time periods, the first, second and fourth transistors are turned off, and in the sixth time period, the first and second transistors are turned off and the fourth transistor is turned on.

10. The memory device of claim 3, configured such that the sensing node is, in the first time period, precharged to a voltage level corresponding to a difference between a positive power supply voltage level supplied to the first transistor and a threshold voltage level of the second transistor.

11. A method in a memory device, the memory device comprising:
    a memory cell array comprising a plurality of memory cells; and
    a page buffer circuit including a plurality of page buffer units respectively connected to the memory cell array via a plurality of bit lines, the plurality of page buffer units each comprising a sensing node connected to the bit line, a sensing latch storing data of the memory cell, a first transistor configured to change data of the sensing latch according to a voltage level of the sensing node, and a boost node configured to boost the sensing node,
    wherein the method includes for each of the page buffer units, during sensing operation, precharging the sensing node in a first time period, setting a voltage level of the sensing node to a threshold voltage of the first transistor in a second time period, boosting up the sensing node by increasing a voltage applied to the boost node by a first voltage level in a third time period, developing the sensing node based on the voltage level of the boosted up sensing node in a fourth time period, boosting down the sensing node by reducing the voltage applied to the boost node by a second voltage level in a fifth time period, and changing a data value of the sensing latch based on the voltage level of the boosted down sensing node in a sixth time period.

12. The method of claim 11, wherein the first voltage level is greater than the second voltage level.

13. The method of claim 11, wherein each of the plurality of page buffer units further comprises a data transfer node, a second transistor configured to precharge the data transfer node, a third transistor connecting the sensing node to the data transfer node, and a fourth transistor connecting the first transistor to the data transfer node.

14. The method of claim 13, wherein, in the first time period, the second and third transistors are turned on and the fourth transistor is turned off, and in the second time period, the second transistor is turned off and the third and fourth transistors are turned on.

15. The method of claim 13, wherein the voltage level of the sensing node included in the page buffer unit corresponding to an on-cell among the plurality of page buffer units is, in the sixth time period, less than a threshold voltage level of the third transistor, and wherein the voltage level of the sensing node included in the page buffer unit corresponding to an off-cell among the plurality of page buffer units is, in the sixth time period, greater than the threshold voltage level of the third transistor.

16. The method of claim 11, wherein the sensing latch comprises:
a first inverter and a second inverter cross coupled each other;
a second transistor configured to supply a positive power supply to the first inverter;
a third transistor configured to supply a positive power supply to the second inverter;
a fourth transistor connecting the data transfer node to an output of the first inverter; and
a fifth transistor connecting the data transfer node to an output of the second inverter,
wherein, during the sixth time period, the data value of the sensing latch is changed in a first state in which the second transistor is turned on and the fourth transistor is turned off or a second state in which the third transistor is turned on and the fourth transistor is turned off.

17. A method for a solid state drive (SSD), the SSD comprising:
a memory cell array; a memory device including a page buffer circuit; and
a memory controller configured to control the memory device,
wherein the page buffer circuit comprises a sensing node connected to a bit line, a sensing latch storing data of a memory cell, a first transistor configured to change data of the sensing latch according to a voltage level of the sensing node, and a boost node for boosting the sensing node,
the method comprising, during a sensing operation, precharging the sensing node, setting the voltage level of the sensing node to a threshold voltage of the first transistor, and changing a data value of the sensing latch based on a set voltage level of the sensing node,
wherein the page buffer circuit further comprises a boost node, and further comprising during the sensing operation, boosting up the set voltage level of the sensing node by increasing a voltage applied to the boost node by a first voltage level, and boosting down the set voltage level of the sensing node by decreasing the voltage applied to the boost node by a second voltage level.

18. The method of claim 17, further comprising, between boosting up the set voltage level of the sensing node and boosting down voltage of the sensing node, developing the sensing node, and as a result of boosting down the voltage of the sensing node, changing a data value of the sensing latch based on the voltage level of the boosted down sensing node.

19. The method of claim 18, wherein the first voltage level is greater than the second voltage level.

20. The method of claim 19, wherein the developed voltage level of the sensing node is greater than a voltage level precharged to the bit line during the sensing operation.

* * * * *